(12) United States Patent
Morozov et al.

(10) Patent No.: US 10,191,196 B2
(45) Date of Patent: Jan. 29, 2019

(54) BACKLIGHT UNIT FOR HOLOGRAPHIC DISPLAY APPARATUS AND HOLOGRAPHIC DISPLAY APPARATUS INCLUDING THE SAME

(71) Applicant: SAMSUNG ELECTRONICS CO., LTD., Suwon-si (KR)

(72) Inventors: Alexander V. Morozov, Moscow area (RU); Andrey N. Putilin, Moscow (RU); Sergey E. Dubynin, Moscow (RU); German B. Dubinin, Moscow area (RU); Sergey S. Kopenkin, Moscow area (RU); Yuriy P. Borodin, Moscow area (RU); Sunil Kim, Seoul (KR); Jungkwuen An, Cheonan-si (KR); Chilsung Choi, Suwon-si (KR); Hongseok Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 55 days.

(21) Appl. No.: 14/926,095

(22) Filed: Oct. 29, 2015

(65) Prior Publication Data

US 2016/0147003 A1 May 26, 2016

(30) Foreign Application Priority Data

Nov. 20, 2014 (RU) .................................. 2014146782
Dec. 11, 2014 (KR) ........................ 10-2014-0178716

(51) Int. Cl.
*F21V 8/00* (2006.01)
*G02B 5/32* (2006.01)
(Continued)

(52) U.S. Cl.
CPC ............ *G02B 6/0023* (2013.01); *G02B 5/32* (2013.01); *G02B 6/0031* (2013.01);
(Continued)

(58) Field of Classification Search
CPC ................. G03H 1/2645; G03H 1/265; G03H 2001/0489; G03H 2001/2655;
(Continued)

(56) References Cited

U.S. PATENT DOCUMENTS 5,426,483 A * 6/1995 Suzuki .................. G03B 13/02
396/14
5,465,311 A 11/1995 Caulfield et al.
(Continued)

FOREIGN PATENT DOCUMENTS

JP          3130329 B2      1/2001
JP       2007219030 A      8/2007
(Continued)

*Primary Examiner* — Jade R Chwasz
(74) *Attorney, Agent, or Firm* — Sughrue Mion, PLLC

(57) ABSTRACT

A backlight unit (BLU), for a binocular holographic display apparatus, and the binocular holographic display apparatus including the BLU are provided. The BLU includes: a light source unit that emits coherent illumination light; and a light guide plate that is transparent and includes a light incidence surface onto which the coherent illumination light emitted by the light source unit is incident and a light emission surface through which the illumination light is output. The light source unit includes a beam deflector that adjusts an incidence angle of the illumination light incident onto the light guide plate.

26 Claims, 17 Drawing Sheets

(51) Int. Cl.
*G03H 1/22* (2006.01)
*G02B 27/00* (2006.01)
*G02B 27/10* (2006.01)
*G02B 27/30* (2006.01)

(52) U.S. Cl.
CPC ....... *G02B 6/0068* (2013.01); *G02B 27/0093* (2013.01); *G02B 27/10* (2013.01); *G02B 27/30* (2013.01); *G03H 1/2286* (2013.01); *G03H 2001/2223* (2013.01); *G03H 2001/2242* (2013.01); *G03H 2222/18* (2013.01); *G03H 2226/05* (2013.01)

(58) Field of Classification Search
CPC ..... G03H 2001/266; G03H 2001/2665; G03H 2001/267; G03H 2001/2675; G03H 2210/10; G03H 2210/20; G03H 2210/30; G03H 2225/33; G03H 2225/34; G03H 1/2294; G03H 1/0005; G03H 1/268; G03H 2222/34; G03H 2001/2226; G03H 2001/0473; G03H 2001/2239; G03H 1/2286; G03H 2001/2223; G03H 2001/2242; G03H 2222/18; G03H 2226/05; G02B 5/32; G02B 2027/0174; G02B 27/225; G02B 27/10; G02B 6/00; G02B 6/001; G02B 6/0023; G02B 6/0031; G02B 6/0068; G02B 27/30; G02B 27/0172; G02B 27/0093

USPC ...................... 359/10, 11, 22, 23, 25, 27, 32
See application file for complete search history.

(56) References Cited

U.S. PATENT DOCUMENTS

| | | | |
|---|---|---|---|
| 5,854,697 A | 12/1998 | Caulfield et al. | |
| 7,379,651 B2 | 5/2008 | Abu-Ageel | |
| 9,086,681 B2 | 7/2015 | Schwerdtner | |
| 2004/0109135 A1* | 6/2004 | Watanabe | A61B 3/1225 351/205 |
| 2008/0212195 A1* | 9/2008 | Yamamoto | G02B 27/0093 359/630 |
| 2010/0046070 A1* | 2/2010 | Mukawa | G02B 27/0176 359/480 |
| 2011/0235179 A1 | 9/2011 | Simmonds | |
| 2011/0285927 A1* | 11/2011 | Schultz | H04N 13/0418 349/15 |
| 2012/0120467 A1 | 5/2012 | Gruhlke et al. | |
| 2012/0188791 A1 | 7/2012 | Voloschenko et al. | |
| 2013/0170004 A1 | 7/2013 | Futterer | |
| 2013/0242555 A1* | 9/2013 | Mukawa | G02B 3/0006 362/237 |
| 2014/0376207 A1 | 12/2014 | Futterer | |

FOREIGN PATENT DOCUMENTS

| | | |
|---|---|---|
| KR | 1020100017870 A | 2/2010 |
| KR | 1020130131372 A | 12/2013 |
| WO | 2013/104781 A1 | 7/2013 |

* cited by examiner

BACKLIGHT UNIT FOR HOLOGRAPHIC DISPLAY APPARATUS AND HOLOGRAPHIC DISPLAY APPARATUS INCLUDING THE SAME

RELATED APPLICATIONS

This application claims priority from Russian Patent Application No. 2014146782, filed on Nov. 20, 2014, in the Russian Patent Office and Korean Patent Application No. 10-2014-0178716, filed on Dec. 11, 2014, in the Korean Intellectual Property Office, the disclosures of which are incorporated herein in their entireties by reference.

BACKGROUND

1. Field

Apparatuses consistent with exemplary embodiments relate to a backlight unit (BLU) and a holographic display apparatus including the same, and more particularly, to a BLU for a binocular holographic display apparatus for providing hologram images having different viewpoints to two viewing zones and a binocular holographic display apparatus including the same.

2. Description of the Related Art

Apparatuses requiring the use of glasses, as well as non-glasses apparatuses have been developed for displaying three-dimensional (3D) images. Method of display requiring glasses include polarization glasses methods and shutter glasses methods, and non-glasses methods include lenticular methods and parallax barrier methods. These methods utilize the a binocular parallax of a viewer's two eyes, but are limited in the number of viewpoints that can be displayed. Also, there is discordance between depths recognized by the brain and by a viewer's eyes, often creating eye fatigue.

Practical use of holographic display methods as 3D image display methods capable of providing both concordance between the depths recognized by the brain and by eyes, and a full parallax, has gradually increased. Holographic display methods irradiate and diffracting a reference beam onto a hologram pattern on which an interference pattern is recorded, having been acquired by interfering an object beam reflected from an object with the reference beam, and light reflected from the holographic pattern reproduces an image of the original object. A current holographic display method provides a computer-generated hologram (CGH) as an electric signal to a spatial light modulator rather than directly exposing an original object to light to acquire a hologram pattern. The spatial light modulator may form the hologram pattern according to an input CGH signal to diffract a reference beam in order to generate a 3D image.

However, a spatial light modulator having both a very high resolution and a very large amount of processed data are required to realize a full holographic display method. In order to reduce the amount of processed data, a binocular holographic method is used to provide hologram images only to viewing zones corresponding to an observer's eyes. For example, the binocular holographic method generates only a hologram image having a viewpoint corresponding to a viewing zone of a left eye of the observer and a hologram image having a viewpoint corresponding to a viewing zone of a right eye of the observer and respectively provides the hologram images to the left and right eyes of the observer. In this case, hologram images of any other viewpoints will not be generated, and thus the amount of processed data will be greatly reduced. Also, display apparatuses that are currently commercialized may satisfy the resolution condition of the spatial light modulator.

SUMMARY

One or more exemplary embodiments may provide a backlight unit (BLU) for a binocular holographic display apparatus that provides hologram images having different viewpoints into two viewing zones, and a binocular holographic display apparatus including the BLU.

According to an aspect of an exemplary embodiment, a BLU includes: a light source unit that provides illumination light; a light guide plate that is transparent and includes a light incidence surface onto which the illumination light, provided from the light source unit, is incident and a light emission surface which emits the illumination light; an input coupler that advances the illumination light, incident onto the light incidence surface of the light guide plate, into the light guide plate; and an output coupler that is disposed on the light emission surface of the light guide plate to emit the illumination light outside the light guide plate. The light source unit may include a beam deflector that adjusts an incidence angle of the illumination light incident onto the light guide plate.

The light source unit may include a first light source unit that provides first illumination light that is directed to a first viewing zone and a second light source unit that provides second illumination light that is directed to a second viewing zone different from the first viewing zone. The light incidence surface may include a first light incidence surface on which the first illumination light is incident and a second light incidence surface on which the second illumination light is incident. The input coupler may include a first input coupler that advances the first illumination light into the light guide plate and a second input coupler that advances the second illumination light into the light guide plate.

The first and second light incidence surfaces may be respectively disposed on opposite sides of the light guide plate. The first light source unit may be disposed to face the first light incidence surface, and the second light source unit may face the second light incidence surface.

The light guide plate may be configured to emit the first illumination light and the second illumination light through the same light emission surface, and the output coupler may be configured to emit the first illumination light and the second illumination light at different angles.

The first light source unit may include: a first light source that generates the first illumination light; a first collimator that collimates the first illumination light; a first beam expander that increases a beam diameter of the first illumination light; and a first beam deflector that adjusts an incidence angle of the first illumination light as incident on the first light incidence surface.

The second light source unit may include: a second light source that generates the second illumination light; a second collimator that collimates the second illumination light; a second beam expander that increases a beam diameter of the second illumination light; and a second beam deflector that adjusts an incidence angle of the second illumination light as incident on the second light incidence surface.

The first and second light sources may be configured to emit coherent white light.

The light source unit may further include: a light source that generates illumination light; a collimator that collimates the illumination light; a beam expander that increases a beam diameter of the illumination light and directs the illumination light to the beam deflector; and a beam splitter that splits the illumination light coming from the beam deflector into first illumination light and second illumination light.

The light incidence surface may include a first light incidence surface onto which the first illumination light is incident and a second light incidence surface onto which the second illumination light is incident. The input coupler may include a first input coupler that advances the first illumination light into the light guide plate and a second input coupler that advances the second illumination light into the light guide plate.

The first and second light incidence surfaces may be respectively disposed on opposite sides of the light guide plate.

The light guide plate may be configured to emit the first illumination light and the second illumination light through the same light emission surface, and the output coupler may be configured to emit the first illumination light into a first viewing zone and the second illumination light into a second viewing zone different from the first viewing zone.

The light source unit may include: a light source that generates illumination light; a collimator that collimates the illumination light; a beam expander that increases a beam diameter of the illumination light; and a beam splitter that splits the illumination light coming from the beam expander into first illumination light and second illumination light.

The beam deflector may include a first beam deflector that adjusts an incidence angle of the first illumination light and a second beam deflector that adjusts an incidence angle of the second illumination light. The light incidence surface may include a first light incidence surface on which the first illumination light is incident and a second light incidence surface on which the second illumination light is incident. The input coupler may include a first input coupler that advances the first illumination light into the light guide plate and a second input coupler that advances the second illumination light into the light guide plate.

The first and second light incidence surfaces may be respectively disposed on opposite sides of the light guide plate.

The light guide plate may be configured to emit the first illumination light and the second illumination light through the same light emission surface, and the output coupler may be configured to emit the first illumination light into a first viewing zone and the second illumination light into a second viewing zone, different from the first viewing zone.

The light source unit may further include: a light source that generates illumination light; a collimator that collimates the illumination light; and a beam expander that increases a beam diameter of the illumination light and provides the illumination light to the beam deflector.

The beam deflector may be constituted to instantaneously alternately provide the illumination light into first and second viewing zones different from each other.

The light incidence surface and the input coupler may be disposed at an edge of the light guide plate, and the light source unit may be disposed opposite the light incidence surface of the light guide plate.

The first and second viewing zones may be in different positions in a horizontal direction, and the light source unit may be disposed at an upper edge or a lower edge disposed in a vertical direction of the light guide plate.

The light source unit may further include a switch that directs the illumination light, deflected by the beam deflector, alternately into the first and second viewing zones, which are different from each other.

The BLU may further include an achromatization element that combines the illumination light, output by the output coupler, into white light.

The input coupler and the output coupler may include holographic gratings having diffraction patterns or photopolymers having periodic refractive index distributions.

The input coupler and the output coupler may be respectively disposed on first and second surfaces of the light guide plate that are opposite to each other. The input coupler may be disposed in an edge area of the first surface, and the output coupler may be disposed in a central area of the second surface.

According to an aspect of another exemplary embodiment, a holographic display apparatus includes: a BLU have a structure as described above; and a spatial light modulator that modulates illumination light, provided from the BLU, to form a hologram image.

The holographic display apparatus may further include an eye tracking unit that tracks positions of pupils of an observer. The beam deflector may adjust an incidence angle of the illumination light incident onto the light guide plate according to changes in the pupils of the observer.

BRIEF DESCRIPTION OF THE DRAWINGS

These and/or other exemplary aspects and advantages will become apparent and more readily appreciated from the following description of the exemplary embodiments, taken in conjunction with the accompanying drawings in which.

DETAILED DESCRIPTION

Figure 1:
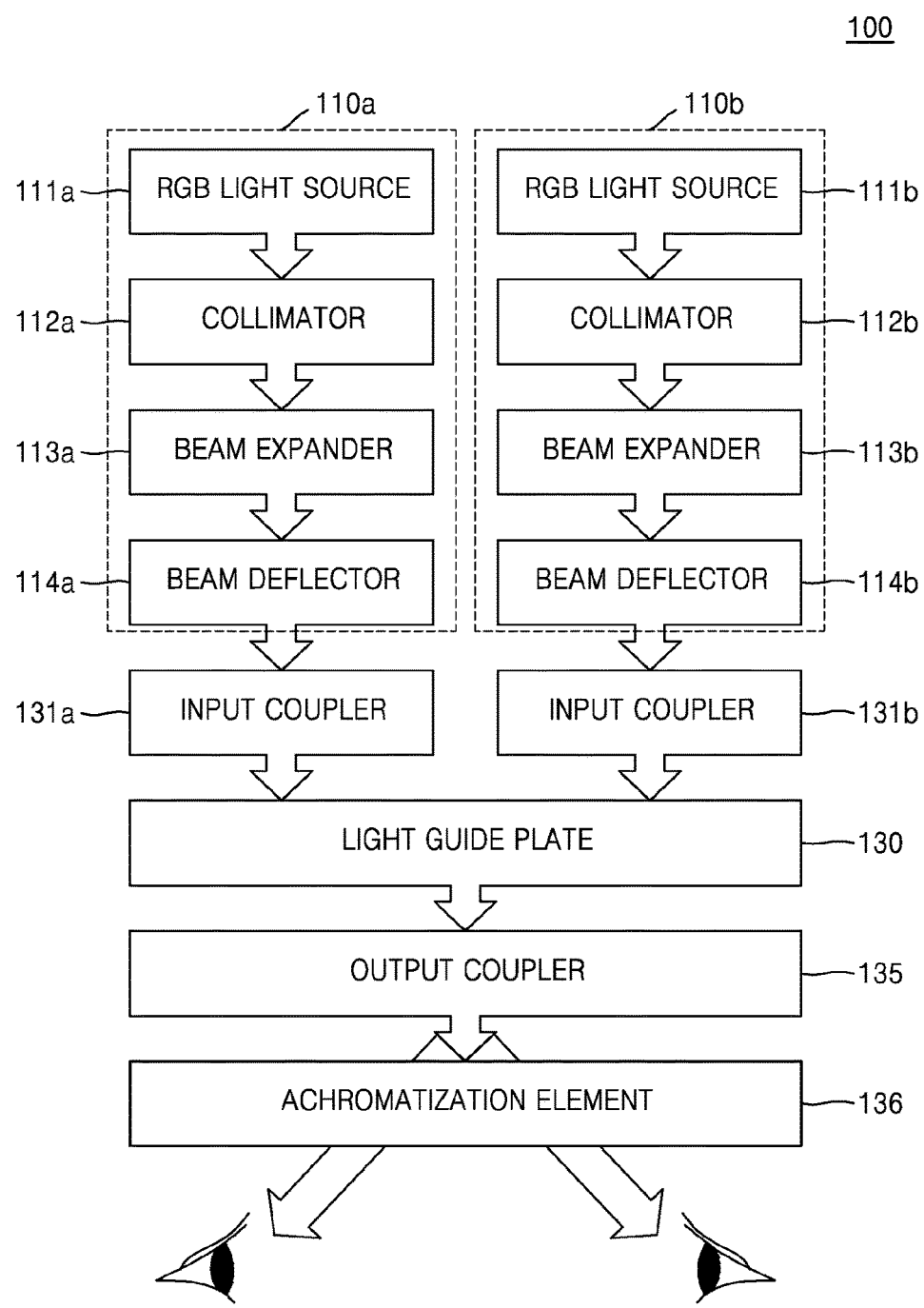
FIG. 1 is a block diagram illustrating a schematic structure of a backlight unit (BLU) according to an exemplary embodiment.

Reference will now be made in detail to exemplary embodiments which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. It will also be understood that when a layer is referred to as being "on" another layer or substrate, it can be directly on the other layer or substrate, or intervening layers may also be present.

FIG. 1 is a block diagram illustrating a schematic structure of a backlight unit (BLU) 100 according to an exemplary embodiment. Referring to FIG. 1, the BLU 100 may include light source units 110a and 110b, a light guide plate 130, input couplers 131a and 131b, and an output coupler 135. The light source units 110a and 110b provide illumination light, and the light guide plate 130 is transparent and includes a light incidence surface, onto which the illumination light provided from the light source units 110a and 110b is incident, and a light emission surface which emits illumination light transmitted therethrough. The input couplers 131a and 131b couple the illumination light, which is incident onto the light incidence surface of the light guide plate 130, into the light guide plate 130. The output coupler 135 is disposed on the light emission surface of the light guide plate 130 to emit the illumination light outside the light guide plate 130. The BLU 100 may further include an achromatization element 136 that combines the illumination light, separated into colors by the output coupler 135, into white light.

According to the present exemplary embodiment, the light source units 110a and 110b of the BLU 100 may provide the illumination light to at least two different viewing zones. For example, the light source units 110a and 110b may include a first light source unit 110a that provides the illumination light to a first viewing zone and a second light source unit 110b that provides the illumination light to a second viewing zone different from the first viewing zone. The first light source unit 110a may provide the illumination light to a viewing zone of a right eye of an observer, and the second light source unit 110b may provide the illumination light to a viewing zone of a left eye of the observer. The input couplers 131a and 131b may include first and second input couplers 131a and 131b to couple the illumination light, respectively emitted from the first and second light source units 110a and 110b, into the light guide plate 130. The light guide plate 130 may include a first light incidence surface, onto which the illumination light emitted from the first light source unit 110a is incident, and a second light incidence surface onto which the illumination light emitted from the second light source unit 110b is incident. As will be described later, the first input coupler 131a may be disposed on the first light incidence surface or may be disposed to face the first light incidence surface. Also, the second input coupler 131b may be disposed on the second light incidence surface or may be disposed to face the second light incidence surface.

For example, the first light source unit 110a may include a first light source 111a that generates illumination light, a first collimator 112a that collimates the illumination light, a first beam expander 113a that increases a beam diameter of the illumination light, and a first beam deflector 114a that adjusts an incidence angle of the illumination light incident onto the first light incidence surface. Like the first light source unit 110a, the second light source unit 110b may include a second light source 111b that generates illumination light, a second collimator 112b that collimates the illumination light, a second beam expander 113b that increases a beam diameter of the illumination light, and a second beam deflector 114b that adjusts an incidence angle of the illumination light incident onto the second light incidence surface.

In order to use the BLU 100 for a holographic display apparatus, the first and second light sources 111a and 111b may include lasers that generate highly coherent light. If the illumination light has some degree of spatial coherence, the illumination light may be fully diffracted and modulated by a spatial light modulator. Therefore, light-emitting diodes (LEDs) may be used as the first and second light sources 111a and 111b. Other than LEDs, any light sources that emit light having some degree of spatial coherence may be used as the first and second light sources 111a and 111b. The first and second light sources 111a and 111b, for example, may include arrays of a plurality of LEDs that respectively emit red (R), green (G), and blue (B) beams, such that the first and second light sources each emit white light.

The first and second collimators 112a and 112b may include refractive lenses or diffraction optical elements having positive refractive powers, in order to collimate the illumination light emitted from the first and second light sources 111a and 111b. Also, the first and second beam expanders 113a and 113b may homogenize the illumination light and increase beam diameters of the illumination light. For example, the first and second beam expanders 113a and 113b may change the shape and size of the illumination light, such that the shape and the size of the illumination light is equal to the shape and size of the first and second light incidence surfaces of the light guide plate 130. For example, the first and second expanders 113a and 113b may include integrator rods or light guide plates. The first and second collimators 112a and 112b are disposed such that they are closer to the first and second light sources 111a and 111b than to the first and second beam expanders 113a and 113b. However, the order of arrangement of the first and second collimators 112a and 112b and the first and second expanders 113a and 113b may be changed. If the first and second light sources 111a and 111b emit collimated illumination light or illumination light having large beam diameters, the first and second collimators 112a and 112b and the first and second beam expanders 113a and 113b may be omitted.

The first and second beam deflectors 114a and 114b may adjust the angles of incidence of the illumination light incident onto the first and second light incidence surfaces of the light guide plate 130. For example, the first and second beam deflectors 114a and 114b may include galvano mirrors capable of rotating reflective surfaces, electrowetting elements capable of electrically changing the slopes of interfaces between polar liquids and nonpolar liquids, acoustic-optic elements capable of changing distributions of refractive indexes by using sound waves, or the like. Alternatively, the first and second beam deflectors 114a and 114b may rotate the entire first and second light source units 110a and 110b without reflecting, refracting, or diffracting light to change traveling angles of the illumination light. The incidence angles of the illumination light respectively incident onto the first and second light incidence surfaces of the light guide plate 130 may be changed by using the first and second beam deflectors 114a and 114b to adjust a traveling direction of illumination light emitted from the light emission surface of the light guide plate 130. Therefore, as will be described in the following text, the BLU 100 according to the present exemplary embodiment may actively respond to changes in eye gazes of the observer.

Figure 2:
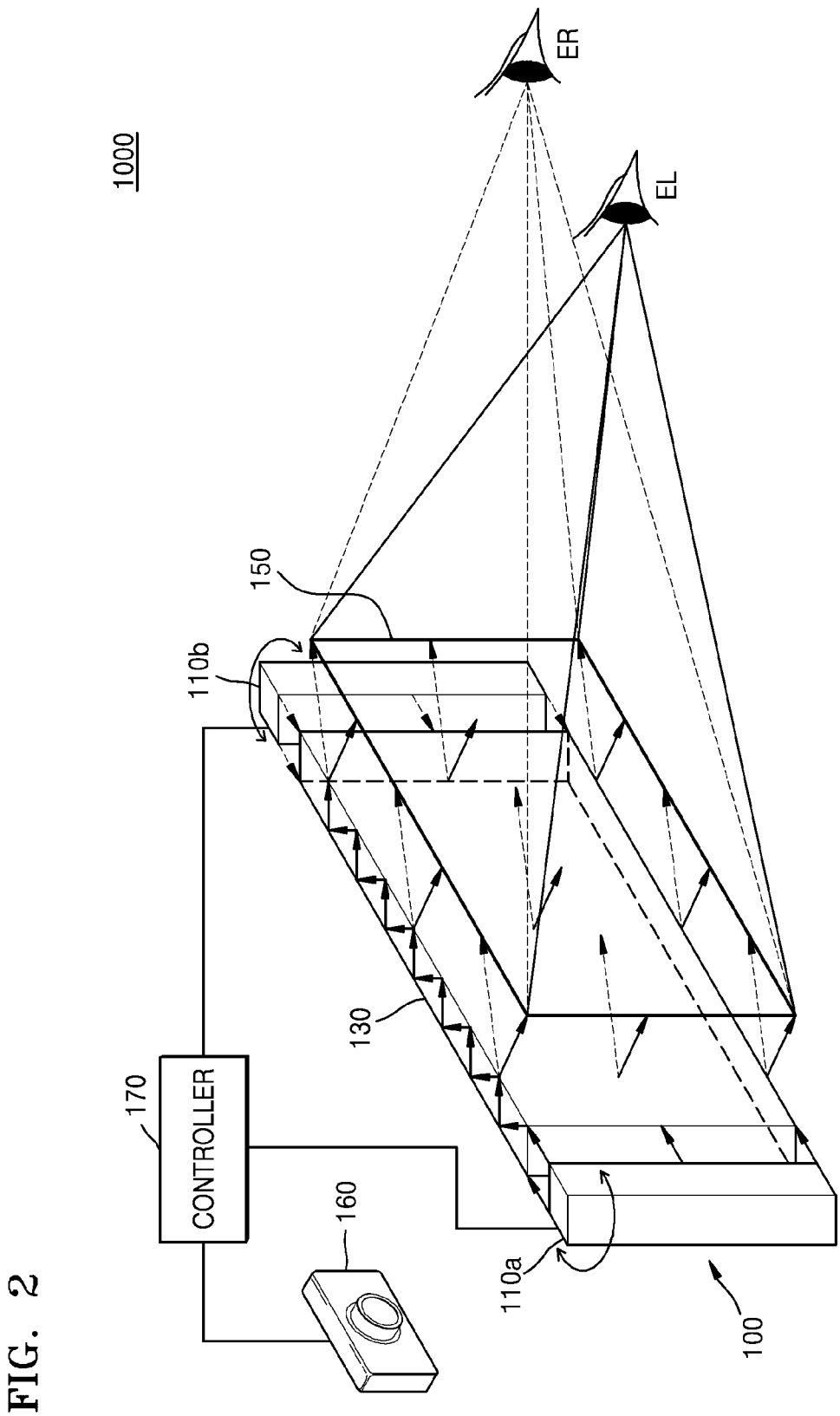
FIG. 2 is a perspective view illustrating a schematic structure of a holographic display apparatus including the BLU of FIG. 1, according to an exemplary embodiment.

FIG. 2 is a perspective view illustrating a schematic structure of a holographic display apparatus 1000 including the BLU 100 of FIG. 1, according to an exemplary embodiment. Referring to FIG. 2, the holographic display apparatus 1000 according to the present exemplary embodiment may include the BLU 100 and a spatial light modulator 150. The BLU 100 provides illumination light to the spatial light modulator 150, and the spatial light modulator 150 forms a hologram pattern having an interference pattern for modulating the illumination light. The illumination light may be diffracted and modulated by the hologram pattern formed by the spatial light modulator 150 to form a hologram image in a position in a predetermined space.

The holographic display apparatus 1000 may further include an eye tracking unit 160, that tracks positions of pupils of the observer, and a controller 170 that controls the first and second beam deflectors 114a and 114b according to the positions of the pupils of the observer measured by the eye tracking unit 160. For example, if the positions of the pupils of the observer are changed, the controller 170 may adjust traveling angles of illumination light by using the first and second beam deflectors 114a and 114b so as to enable the position of the space, in which the hologram image is formed, to correspond to the positions of the pupils of the observer.

The holographic display apparatus 100 having the above-described structure may provide hologram images having different viewpoints into a left eye EL and a right eye ER of an observer by using a binocular holographic method. For example, the holographic display apparatus 1000 may check positions of the left eye EL and the right eye ER of the observer by using the eye tracking unit 160 to provide a left eye hologram image into a viewing zone of the left eye EL of the observer and a right eye hologram image different from the left eye hologram image into a viewing zone of the right eye ER of the observer.

Unlike a left eye image and a right eye image of a stereoscopic method, the left eye hologram image and the right eye hologram image provided by the holographic display apparatus 1000 may independently provide 3-dimensional (3D) effects to the observer and may have different viewpoints. When a left eye 2-dimensional (2D) image and a right eye 2D image are recognized by the left and right eyes of the observer, the stereoscopic method provides a 3D effect using the principle of binocular parallax. Therefore, in the stereoscopic method, a 3D effect is not provided by only one of left and right eye images, but rather by the combination in the brain of the two images, and a discordance between depth recognized by brain and the focus of an observer's eyes may make the observer feel eye fatigue. However, the holographic display apparatus 1000 forms the left eye hologram image and the right eye hologram image in positions in predetermined spaces, i.e., in the viewing zones of the left eye EL and the right eye ER, respectively, of the observer. Therefore, the holographic display apparatus 1000 may provide a coincidence between the depth recognized by the brain and the eye focuses and also provide a full parallax. Since the observer recognizes only two viewpoints with the left and right eyes, the holographic display apparatus 1000 according to the present exemplary embodiment provides only binocular viewpoints, and omits information viewpoints other than those recognized by the observer, so as to reduce an amount of processed data and form hologram images through the spatial light modulator 150 having a relatively low resolution.

Referring to FIG. 2 again, the first and second light source units 110a and 110b may be disposed on opposite sides of the light guide plate 130, for example, on the left and right sides of the light guide plate 130. For example, the first light source unit 110a may be disposed on the left side of the light guide plate 130, and the second light source unit 110b may be disposed on the right side of the light guide plate 130. In FIG. 2, the first and second light source units 110a and 110b directly face the left and right sides of the light guide plate 130, respectively, but the positions of the first and second light source units 110a and 110b are not limited thereto. For example, the first light source unit 110a may be disposed around a left edge of the light guide plate 130, and the second light source unit 110b may be disposed around a right edge of the light guide plate 130. Detailed positions of the first and second light source units 110a and 110b may be changed according to positions and structures of the input couplers 131a and 131b of the light guide plate 130.

Illumination light provided from the first light source unit 110a may be incident onto the left side of the light guide plate 130, emitted toward a front surface of the light guide plate 130, and incident onto the spatial light modulator 150. The spatial light modulator 150 may modulate the illumination light provided from the first light source unit 110a to form a hologram image in the viewing zone of the right eye ER of the observer. Illumination light provided from the second light source unit 110b may be incident onto the right side of the light guide plate 130, emitted toward the front surface of the light guide plate 130, and incident onto the spatial light modulator 150. The spatial light modulator 150 may modulate the illumination light provided from the second light source unit 110b to form a hologram image in the viewing zone of the left eye EL of the observer.

The first and second light source units 110a and 110b may simultaneously emit the illumination light but may be instantaneously alternately turned on and/or off. For example, when the first light source unit 110a is turned on to provide illumination light, the second light source unit 110b may be turned off. In this case, a hologram image may be provided only in the viewing zone of the right eye ER of the observer. In this case, the spatial light modulator 150 may form a hologram pattern for forming the right eye hologram image. The first light source unit 110a may be turned off, and the second light source unit 110b may be turned on to provide illumination light. In this case, a hologram image may be provided only into the viewing zone of the left eye EL of the observer. In this case, the spatial light modulator 150 may form a hologram pattern for forming the left eye hologram image. Also, the first and second light source units 110a and 110b may simultaneously provide illumination light, and the spatial light modulator 150 may overlap and display both the hologram pattern for forming the left eye hologram image and the hologram pattern for forming the right eye hologram image. In this case, the right eye hologram image and the left eye hologram image may be respectively provided into the viewing zones of the right eye ER and the left eye EL of the observer. Operations of the first and second light source units 110a and 110b and the spatial light modulator 150 may be controlled by the controller 170.

If the observer shifts a position or moves his head so as to change the positions of the pupils of the observer, the eye tracking unit 160 may track positions of the pupils of the observer and provide the tracked positions of the pupils of the observer to the controller 170. Therefore, the controller 170 may control the first and second beam deflectors 114a and 114b of the first and second light source units 110a and 110b to form the right eye hologram image and the left eye hologram image according to the changed positions of the pupils of the observer. In other words, the controller 170 may respond to the changes in the positions of the pupils of the observer to change traveling angles of the illumination light using the first and second beam deflectors 114a and 114b. For example, as illustrated with arrows in FIG. 2, the first and second light source units 110a and 110b may be each rotate to change angles of illumination light incident onto the light guide plate 130. Alternatively, the traveling angles of the illumination light may be changed by using galvano minors, electrowetting elements, acoustic-optic elements, or the like.

As described above, the BLU 100 according to the present exemplary embodiment may change the traveling angles of the illumination light. Therefore, the holographic display apparatus 1000 using the binocular hologram method may adjust positions of viewing zones, in which hologram images are formed, according to motions of the observer. The BLU 100 according to the present exemplary embodiment may also be manufactured to be very thin and to effectively provide homogenous illumination light by using the first and second beam deflectors 113a and 113b and the light guide plate 130.

Figure 3:
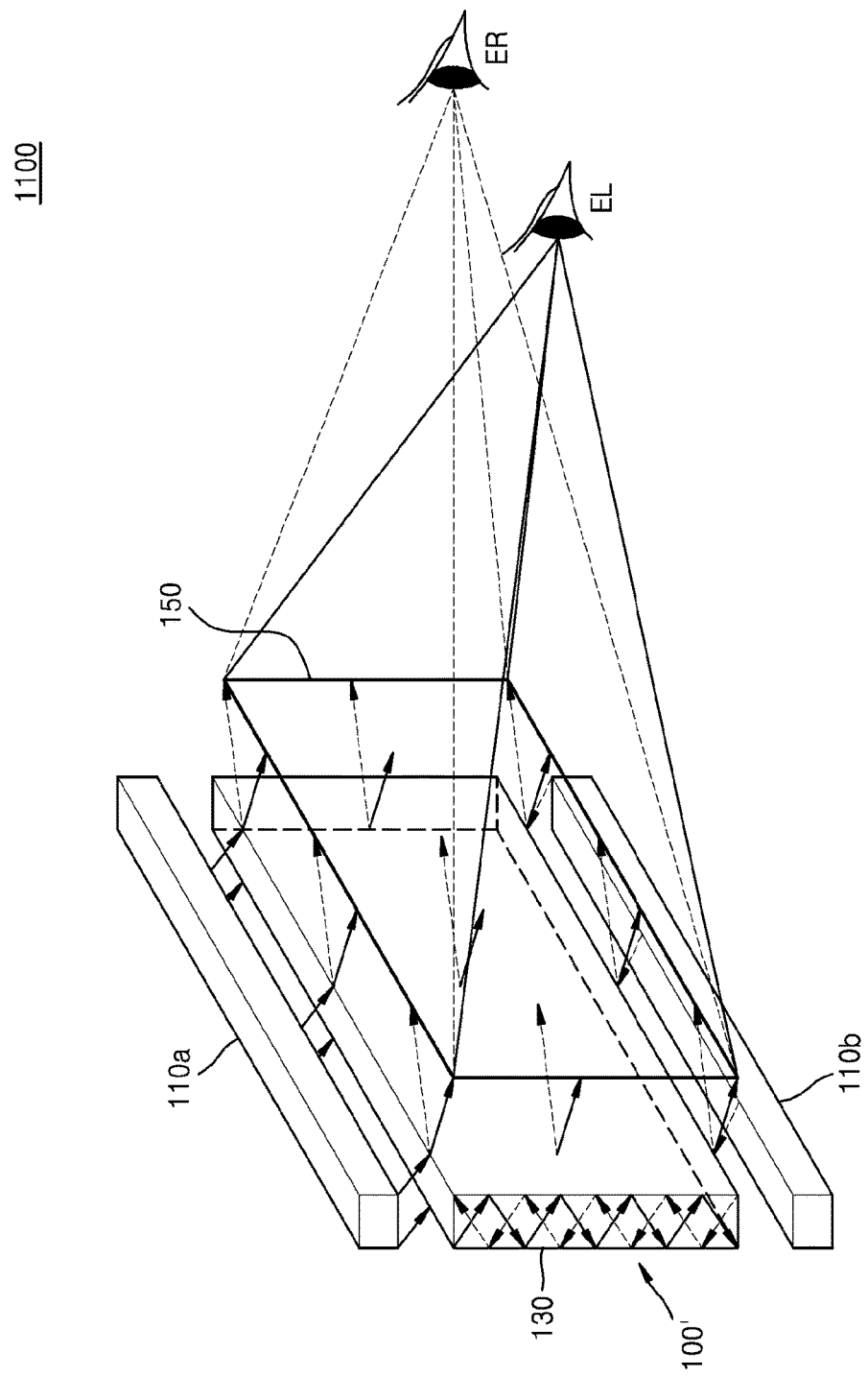
FIG. 3 is a perspective view illustrating a schematic structure of a holographic display apparatus according to another exemplary embodiment.

FIG. 3 is a perspective view illustrating a schematic structure of a holographic display apparatus 1100 according to another exemplary embodiment. Referring to FIG. 3, the holographic display apparatus 1100 is different from the holographic display apparatus 1000 of FIG. 2 in that a BLU 100' includes the first and second light source units 110a and 110b respectively disposed on upper and lower sides of the light guide plate 130. In other words, when viewing zones of a left eye EL and a right eye ER are defined as being in different positions (left and right) along a horizontal direction, the first and second light source units 110 and 110b may be disposed at an upper or lower edge of the light guide plate 130 that is arranged in a vertical direction of the light guide plate 130. For example, the first light source unit 110a may be disposed on the upper side of the light guide plate 130, and the second light source 110b may be disposed on the lower side of the light guide plate 130. There is a common ground between the exemplary embodiments described with reference to FIGS. 2 and 3 in that the first and second light source units 110a and 110b are disposed on opposite sides of the light guide plate 130.

Figure 4:
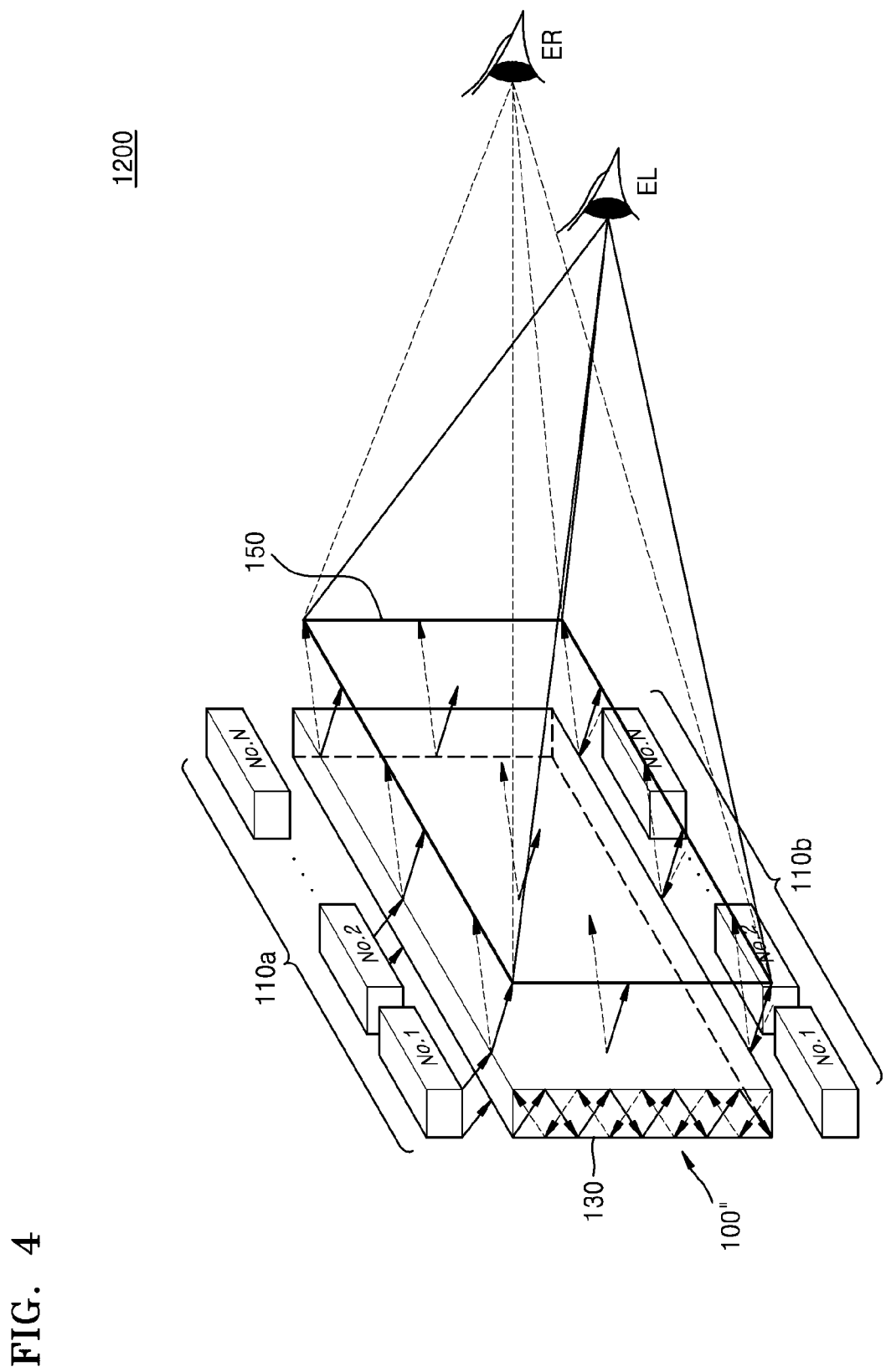
FIG. 4 is a perspective view illustrating a schematic structure of a holographic display apparatus according to another exemplary embodiment.

FIG. 4 is a perspective view illustrating a schematic structure of a holographic display apparatus 1200 according to another exemplary embodiment. Referring to FIG. 4, the holographic display apparatus 1200 is different from the holographic display apparatus 1100 of FIG. 3 in that the first and second light source units 110a and 110b of a BLU 100'' each include an array of a plurality of light source cells. For example, the first light source unit 110a may include a plurality of light source cells disposed along an upper side of the light guide plate 130, and the second light source unit 110b may include a plurality of light source cells disposed along a lower side of the light guide plate 130. The first light source 111a, the first collimator 112a, the first beam expander 113a, and the first beam deflector 114a may be disposed in each of a plurality of source cells of the first light source unit 110a. Also, the second light source 111b, the second collimator 112b, the second beam expander 113b, and the second beam deflector 114b may be disposed in each of a plurality of light source cells of the second light source unit 110b. Although not shown in FIG. 2, the first and second light source units 110a and 110b of the BLU 100 of FIG. 2 may also each include an array of a plurality of light source cells.

Figure 5:
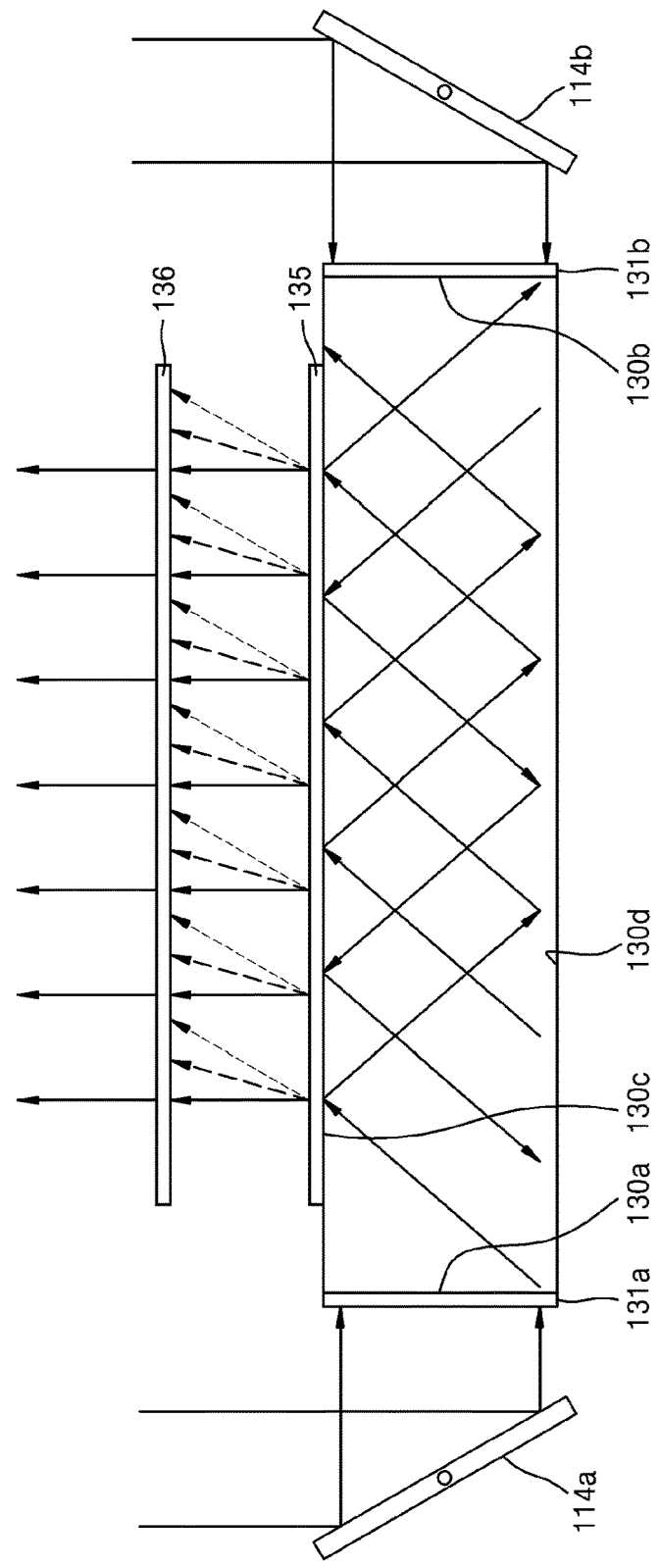
FIG. 5 is a cross-sectional view illustrating structures of a beam deflector and a light guide plate of the BLU of FIG. 1, according to an exemplary embodiment.

FIG. 5 is a cross-sectional view illustrating structures of the beam deflectors 114a and 114b and the light guide plate 130 of the BLU 100 of FIG. 1. As shown in FIGS. 2 through 4, the light guide plate 130 emits illumination light which is incident from both sides of the light guide plate 130, toward a front surface of the light guide plate 130 to uniformly provide the illumination light into an entire area of the spatial light modulator 150. Also, angles and directions of illumination light emitted from the light guide plate 130 depend on angles and directions of illumination light incident onto the light guide plate 130. Therefore, the light guide plate 130 may emit illumination light incident from the first and second light source units 110a and 110b at different angles and in different directions. Therefore, hologram images may be formed in the viewing zones of the left eye EL and the right eye ER of the observer, and positions in which the hologram images are formed may be adjusted by using the beam deflectors 114a and 114b. A structure of the light guide plate 130 as described above will now be described in detail.

Referring to FIG. 5, the light guide plate 130 may be formed of a transparent material in a flat panel shape. The sides 130a and 130b of the light guide plate 130 are respectively first and second light incidence surfaces onto which illumination light is incident, and a front surface 130c of the light guide plate 130 is a light emission surface which emits the illumination light beams. The first and second input couplers 131a and 131b may be disposed on the first and second light incidence surfaces on opposite sides of the light guide plate 130, to couple the illumination light into the light guide plate 130. Also, the output coupler 135 may be disposed on the light emission surface disposed on the front surface 130c of the light guide plate 130, to emit the illumination light outside the light guide plate 130. The first and second beam deflectors 114a and 114b may be disposed to be respectively opposite the first and second input couplers 131a and 131b. The first and second beam deflectors 114a and 114b are illustrated as galvano minors in FIG. 5 but may be electrowetting elements or acoustic-optic elements. Alternatively, the first and second beam deflectors 114a and 114b may be mechanical rotation devices that rotate the first and second light source units 110a and 110b themselves. For convenience of description, only the first and second beam deflectors 114a and 114b are illustrated in FIG. 5, but the first and second light source units 110a and 110b may be disposed to be respectively opposite to the first and second light incidence surfaces.

The first and second input couplers 131a and 131b may be diffractive optical elements that diffract and transmit illumination light to couple the illumination light into the light guide plate 130 at an angle. For example, the first and second input couplers 131a and 131b may be holographic gratings having predetermined diffraction patterns or photopolymers having periodic refractive index distributions. The illumination light may travel into the light guide plate 130 at an angle, such that the illumination light is totally internally reflected within the light guide plate 130, from the front surface 130c and a rear surface 130d of the light guide plate 130. Therefore, the illumination light may travel into the light guide plate 130 without being lost. When illumination light is incident onto the output coupler 135 disposed on the front surface 130c of the light guide plate 130, a portion of the illumination light may be emitted to the outside through the front surface 130c of the light guide plate 130 by the output coupler 135, and the rest of the illumination light may be totally internally reflected. According to this method, the illumination light may be uniformly emitted onto an entire area of the light emission surface of the light guide plate 130. The output coupler 135 may be a diffractive optical element that diffracts and transmits a portion of illumination light. For example, the output coupler 135 may be a holographic grating having a predetermined diffraction pattern or a photopolymer having a periodic refractive index distribution.

The first and second input couplers 131a and 131b and the output coupler 135 may have slight wavelength-dependences or chromatic aberrations according to their structures. In this case, white illumination light may be separated into different component colors. For example, red, green, and blue light may be emitted from the light emission surface of the light guide plate 130 at different angles. In this case, the quality of illumination light incident onto the spatial light modulator 150 may be deteriorated, thus forming a hologram image having distorted color. In order to prevent the deterioration in the quality of the illumination light, the achromatization element 136 may be disposed to be opposite to the light emission surface of the light guide plate 130 so as to combine the illumination light, separated into different colors by the output coupler 135, into white light. For example, the achromatization element 136 may be a diffractive optical element that diffracts and transmits red, green, and blue light that has been separated and travel at different angles, to redirect the red, green, and blue light at the same angle.

The first and second input couplers 131a and 131b and the output coupler 135 may be configured to perpendicularly emit illumination light, which is perpendicularly incident onto the first and second light incidence surfaces of the light guide plate 130, from the light emission surface of the light guide plate 130. For example, the first and second input couplers 131a and 131b may be configured to couple illumination light, which is respectively perpendicularly incident onto the first and second light incidence surfaces of the light guide plate 130, into the light guide plate 130 at an angle of θ. Also, the output coupler 135 may be configured to perpendicularly diffract illumination light, which is incident at an angle of θ, on the light emission surface of the light guide plate 130. However, according to exemplary embodiments, relations between incidence angles of illumination light incident onto the first and second light incidence surfaces and an emission angle of illumination light emitted from the light emission surface may be differently selected. For example, illumination light incident onto the first and second light incidence surfaces at an angle of θ1 may be perpendicularly emitted from the light emission surface or illumination light perpendicularly incident onto the first and second light incidence surfaces may be emitted from the light emission surface at an angle of θ2.

A relation between an incidence angle of illumination light incident onto the first light incidence surface and an emission angle of illumination light emitted from the light emission surface may be selected to be different from a relation between an incidence angle of illumination light incident onto the second light incidence surface and an emission angle of illumination light emitted from the light emission surface. For example, illumination light that travels to the right side through the first light incidence surface in the light guide plate 130 may be emitted from the light guide plate 130 toward the viewing zone of the right eye ER of the observer by the output coupler 135. Illumination light that travels to the left side through the second light incidence surface in the light guide plate 130 may be emitted from the light guide plate 130 toward the viewing zone of the left eye EL of the observer by the output coupler 135.

Figure 6A:
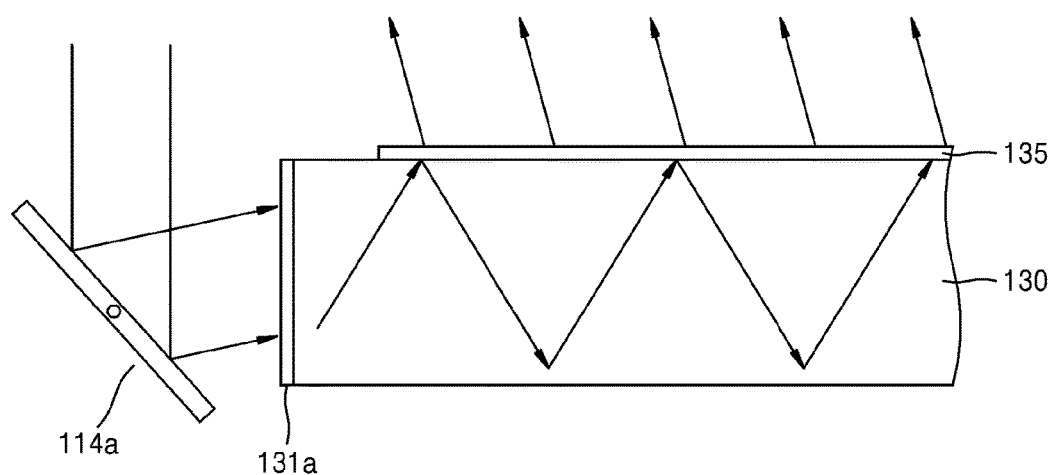
FIGS. 6A and 6B are cross-sectional views illustrating an operation of the beam deflector of the BLU of FIG. 1, according to an exemplary embodiment.
Figure 6B:
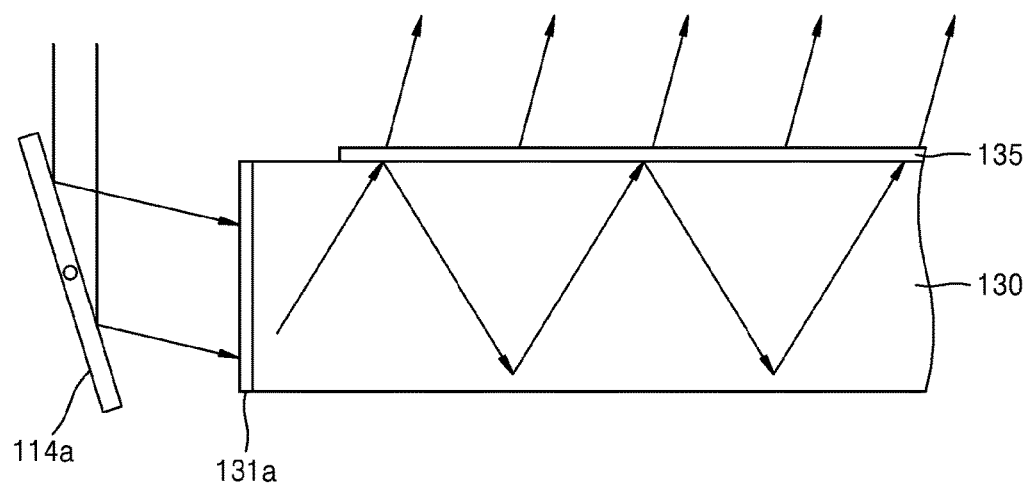

If incidence angles of illumination light incident onto the first and second light incidence surfaces of the light guide plate 130 are changed in this structure, an emission angle of illumination light emitted toward the light emission surface of the light guide plate 130 is changed by the output coupler 135. Therefore, the incidence angles of the illumination light may be adjusted by using the first and second beam deflectors 114a and 114b to control the emission angle of the illumination light emitted from the light emission surface of the light guide plate 130. For example, as schematically shown in FIGS. 6A and 6B, a traveling angle of light that travels into the light guide plate 130 through the first input coupler 131a may be changed by the first beam deflector 114a. Therefore, the emission angle of the illumination light emitted from the light emission surface of the light guide plate 130 may be adjusted by the first beam deflector 114a. As a result, a traveling direction of illumination light may be adjusted according to changes in positions of the pupils of the observer by using the first and second beam deflectors 114a and 114b.

Figure 7:
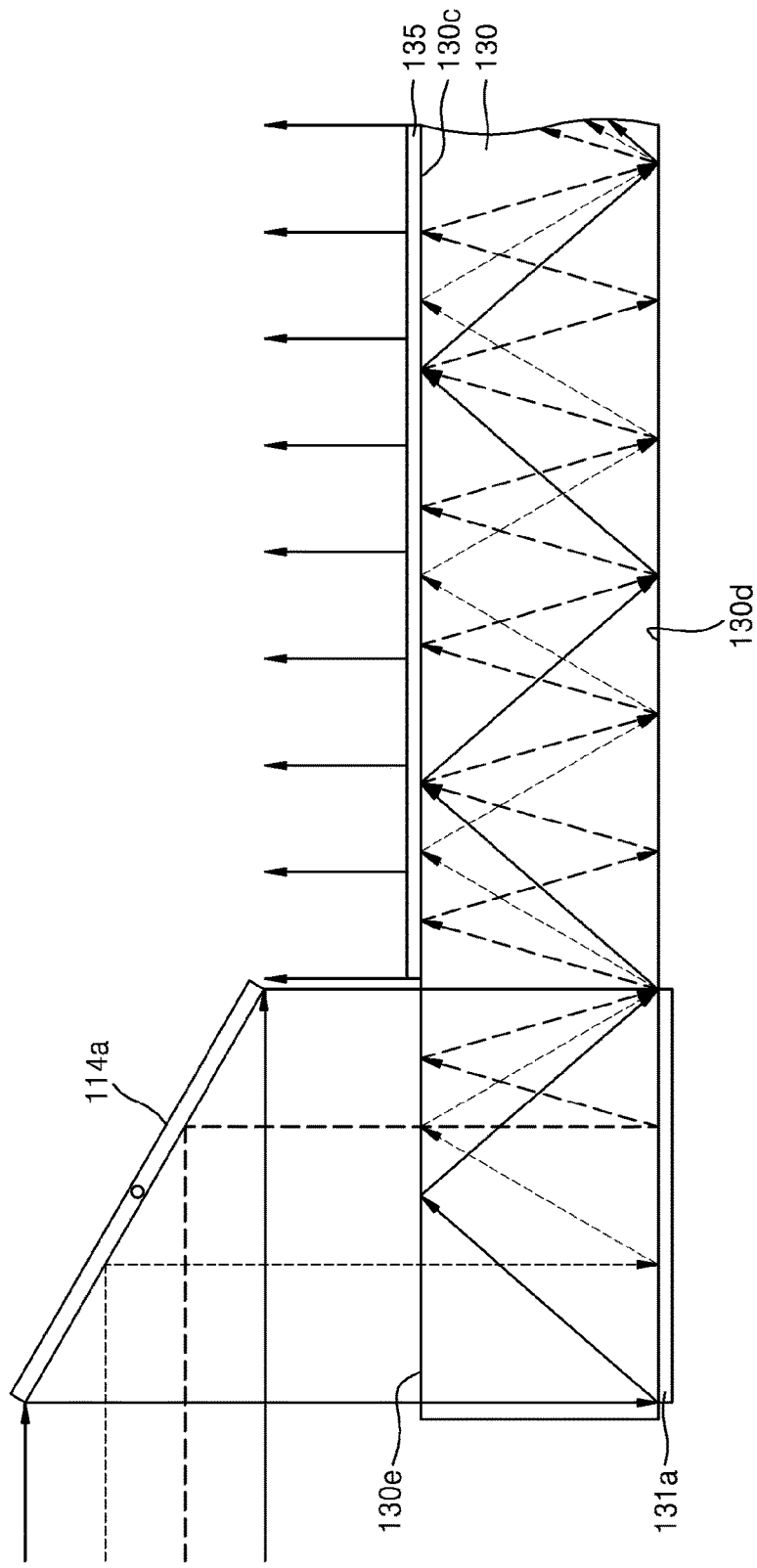
FIGS. 7 through 9 are cross-sectional views illustrating various structures of the beam deflector and the light guide plate of the BLU of FIG. 1, according to exemplary embodiments.
Figure 8:
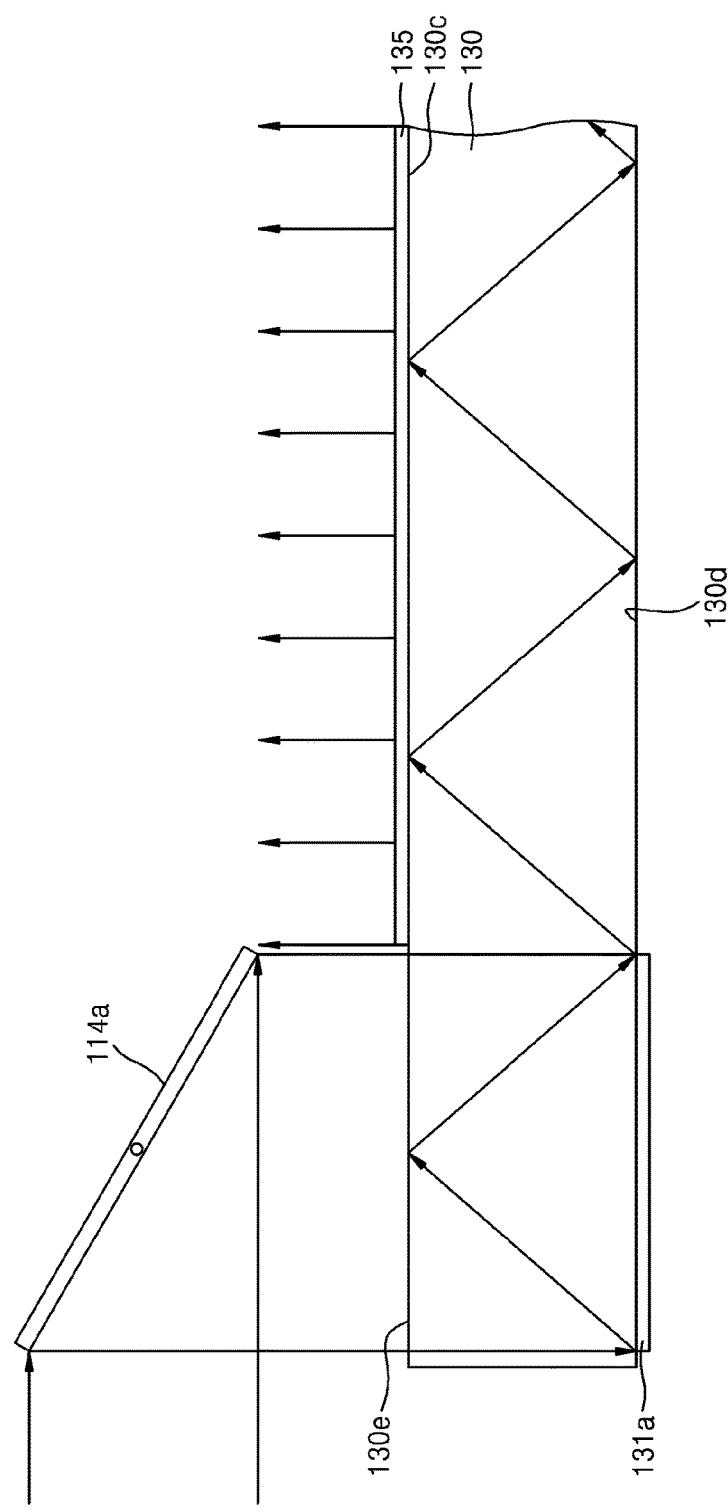
Figure 9:
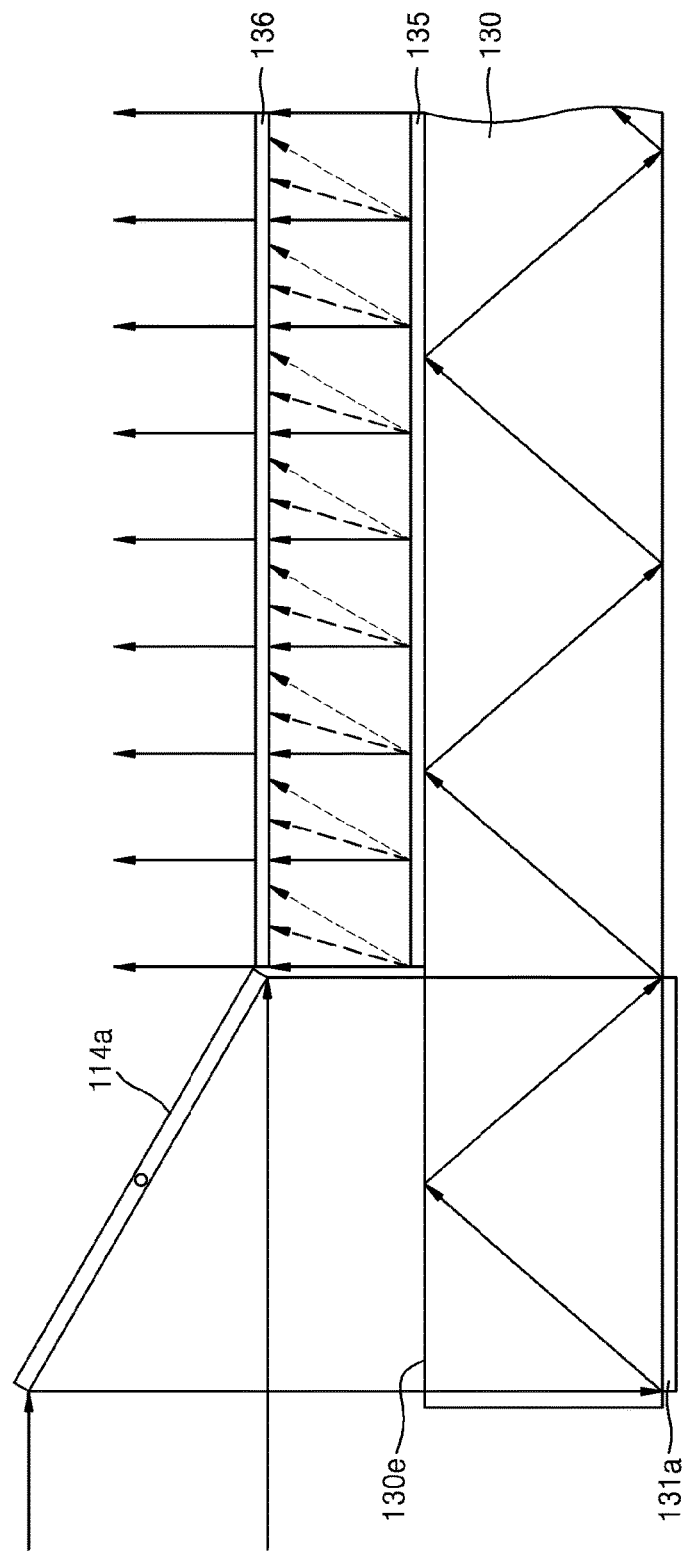

As described with reference to FIGS. 5, 6A, and 6B, illumination light is incident onto both sides 130a and 130b of the light guide plate 130, and the first and second input couplers 131a and 131b are disposed on both sides 130a and 130b of the light guide plate 130. However, this is only an exemplary embodiment. A light guide plate having any of various structures may be used, a light incidence surface of illumination light and a position of an input coupler may be variously selected. Also, a position of a beam deflector may be changed according to a position of the light incidence surface. For example, FIGS. 7 through 9 are cross-sectional views illustrating various structures of a beam deflector and a light guide plate of the BLU 100 of FIG. 1, according to exemplary embodiments. The structure of the light guide plate 130 described with reference to FIGS. 5, 6A, and 6B and a structure of the light guide plate 130 that will be described with reference to FIGS. 7 through 9 may be applied to the BLUs 100' and 100" described with reference to FIGS. 3 and 4.

Referring to FIG. 7, the output coupler 135 may be disposed on the front surface 130c of the light guide plate 130, and the first input coupler 131a may be disposed on the rear surface 130d of the light guide plate 130. Although not shown in FIG. 7 for convenience of description, the second input coupler 131b may also be disposed on the rear surface 130d of the light guide plate 130. For example, the first input coupler 131a may be partially disposed in a left edge area of the rear surface 130d, and the second input coupler 131b may be partially disposed in a right edge area of the rear surface 130d. Therefore, the first and second input couplers 131a and 131b and the output coupler 135 are respectively disposed on the rear surface 130d and the front surface 130c that are two opposite surfaces of the light guide plate 130. A light incidence surface 130e of the light guide plate 130, onto which illumination light is incident, may be formed in both edge areas of the front surface 130c that are opposite the first and second input couplers 131a and 131b. The output coupler 135 is not disposed in the edge areas of the front surface 130c of the light guide plate 130 to locate the light incidence surface 130e. In other words, the output coupler 135 may be partially disposed in a central area of the front surface 130c of the light guide plate 130.

In this case, the first and second beam deflectors 114a and 114b may be disposed to be opposite the light incidence surfaces 130e that are positioned in both edge areas of the front surface 130c of the light guide plate 130. A galvano mirror is exemplarily illustrated as the first beam deflector 114a in FIG. 7, but an electrowetting element or an acoustic-optic element may be used as the first beam deflector 114a. Alternatively, a mechanical rotation device that rotates the first and second light source units 110a and 110b may be used as the first beam deflector 114a. Also, for convenience of description, only the first beam deflector 114a is illustrated in FIG. 7, but the first light source unit 110a may be disposed to be opposite both edge areas of the front surface 130c of the light guide plate 130. Although omitted in FIG. 7, the second beam deflector 114b and the second input coupler 131b may be disposed to be respectively symmetrical to the first beam deflector 114a and the first input coupler 131a at a right edge of the light guide plate 130. Structures and operations of the first beam deflector 114a and the first input coupler 131a that will be described hereinafter may be symmetrically applied to the second beam deflector 114b and the second input coupler 131b.

In this structure, illumination light emitted from the first light source unit 110a may be incident onto the first input coupler 131a through the left edge area of the front surface 130c of the light guide plate 130. The first input coupler 131a may be a diffractive optical element that diffracts and reflects illumination light to direct the illumination light into the light guide plate 130 at an angle. For example, the first input coupler 131a may be a holographic grating that separates white light into components of red, green, and blue light by diffracting the red, green, and blue light at different angles. The R, G, and B light, separated by the first input coupler 131 may travel into the light guide plate 130 at different angles. The output coupler 135 may be a holographic grating that is configured to emit the red, green, and blue light from the light guide plate 130 at the same angle. Therefore, the red green, and blue light, separated by the first input coupler 131, may be combined into white light as emitted from the light guide plate 130 by the output coupler 135.

The first beam deflector 114a may adjust an incidence angle of illumination light incident onto the first input coupler 131a. If the incidence angle of the illumination light incident onto the first input coupler 131a is changed, the angles by which the red, green, and blue light, diffracted and reflected by the first input coupler 131a, travel into the light guide plate 130 are changed. Therefore, an emission angle of illumination light emitted from the light emission surface of the light guide plate 130 is changed by the output coupler 135. As a result, the incidence angle of the illumination light may be adjusted by using the first beam deflector 114a to control the emission angle of the illumination light emitted from the light emission surface of the light guide plate 130.

A structure of the light guide plate 130 of FIG. 8 is equal to the structure of the light guide plate 130 of FIG. 7, but the first input coupler 131a of FIG. 8 is a photopolymer having a periodic refractive index distribution. For example, the first input coupler 131a may diffract and reflect R, G, and B light at the same angle. Therefore, white illumination light may not be color-separated by the first input coupler 131a and may travel into the light guide plate 130 as white light.

A structure of the light guide plate 130 of FIG. 9 is equal to the structure of the light guide plate 130 of FIG. 8, but the achromatization element 136 is further included. The output coupler 135 may have a slight wavelength dependence or a chromatic aberration according to a structure thereof. In this case, white illumination light may be color-separated. In order to prevent this, the achromatization element 136 that combines the illumination light, color-separated by the output coupler 135, into white light may be disposed to be opposite the light emission surface of the light guide plate 130. The achromatization element 136 may be a diffractive optical element that diffracts and transmits red, green, and blue light, which have been color-separated and travel at different angles, to redirect the red, green, and blue light at the same angle. The achromatization element 136 may be further disposed on the light guide plate 130 of FIG. 7.

As shown in FIGS. 7 through 9, the first input coupler 131a is disposed on the rear surface 130d of the light guide plate 130 to be opposite the light incidence surface 130e, and diffracts and reflects illumination light but is not limited thereto. For example, the light incidence surface 130e may be formed on the rear surface 130d of the light guide plate 130, and the first input coupler 131a may be directly disposed on the light incidence surface 130e, that is the rear surface 130d of the light guide plate 130. In this case, illumination light may be incident toward the rear surface 130d of the light guide plate 130, and the first input coupler 131a may diffract and transmit the illumination light. Alternatively, the first input coupler 131a may be directly disposed on the light incidence surface 130e that is the front surface 130c of the light guide plate 130, and diffract and transmit the illumination light.

Figure 10:
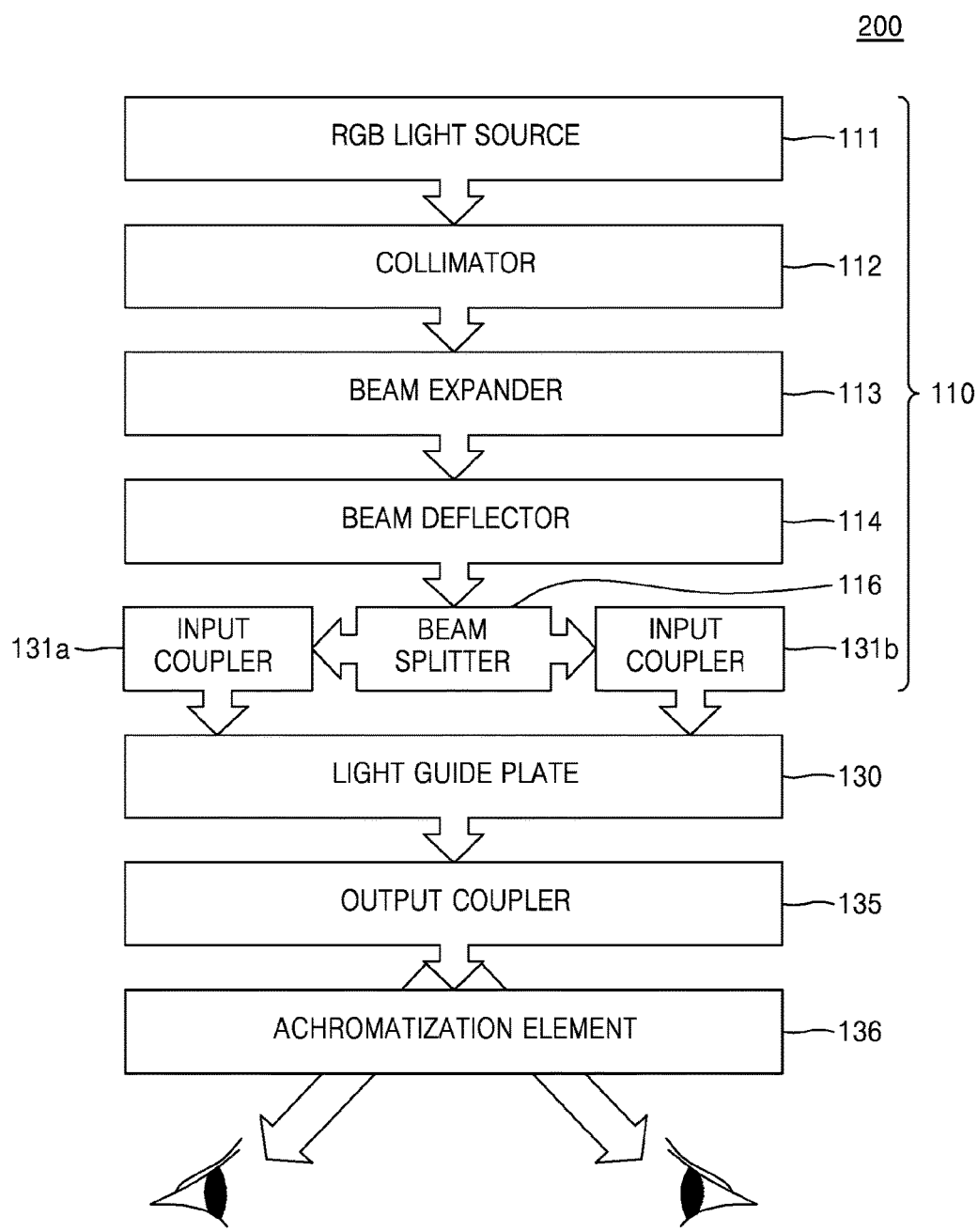
FIG. 10 is a block diagram illustrating a schematic structure of a BLU according to another exemplary embodiment.

FIG. 10 is a block diagram illustrating a schematic structure of a BLU 200 according to another exemplary embodiment. Referring to FIG. 10, the BLU 200 includes the light source unit 110, the light guide plate 130, the input couplers 131a and 131b, the output coupler 135, and the achromatization element 136. The light source unit 110 provides illumination light, and the light guide plate 130 is transparent and includes a light incidence surface, onto which the illumination light provided from the light source unit 110 is incident, and a light emission surface, which emits the incident illumination light. The input couplers 131a and 131b are disposed on the light incidence surface of the light guide plate 130 to couple the illumination light incident onto the light incidence surface into the light guide plate 130. The output coupler 135 is disposed on the light emission surface of the light guide plate 130 to emit the illumination light outside the light guide plate 130. The achromatization element 136 combines the illumination light, separated into different colors by the output coupler 135, into white light.

The light source unit 110 may include a light source 111, a collimator 112, a beam expander 113, a beam deflector 114, and a beam splitter 116. The light source 111 generates illumination light, and the collimator 112 collimates the illumination light. The beam expander 113 increases a beam diameter of the illumination light, and the beam deflector 114 adjusts an incidence angle of the illumination light incident onto the light guide plate 130. The beam splitter 116 splits the illumination light into two beams. The illumination light may be split into a beam of first illumination light and a beam of second illumination light by the beam splitter 116. The first illumination light is provided to a first viewing zone (e.g., a viewing zone of a right eye of an observer), and the second illumination light is provided to a second viewing zone (e.g., a viewing zone of a left eye of the observer). For example, the beam splitter 116 may be a transflective mirror that transmits half of the illumination light and reflects the other half. Alternatively, the beam splitter 116 may be a minor system that is configured to reflect the half of the illumination light in a first direction and the other half of the illumination light in a second direction different from the first direction.

The first illumination light and the second illumination light, split by the beam splitter 116, may be incident into different areas of the light guide plate 130. The light guide plate 130 may include a first light incidence surface onto which the first illumination light is incident and a second light incidence surface onto which the second illumination light is incident. Also, in order to couple the first illumination light and the second illumination light into the light guide plate 130, the input couplers 131a and 131b may include the first input coupler 131a and the second input coupler 131b. As shown in FIG. 5, the first and second input couplers 131a and 131b may be disposed on the light incidence surfaces of the light guide plate 130. Alternatively, as shown in FIG. 7, the first and second input couplers 131a and 131b may be disposed on a surface of the light guide plate 130 that is opposite to the light incidence surface of the light guide plate 130. According to the present exemplary embodiment, hologram images may be formed in the viewing zones of the left eye EL and the right eye ER of the observer by using only the light source unit 110.

Figure 11:
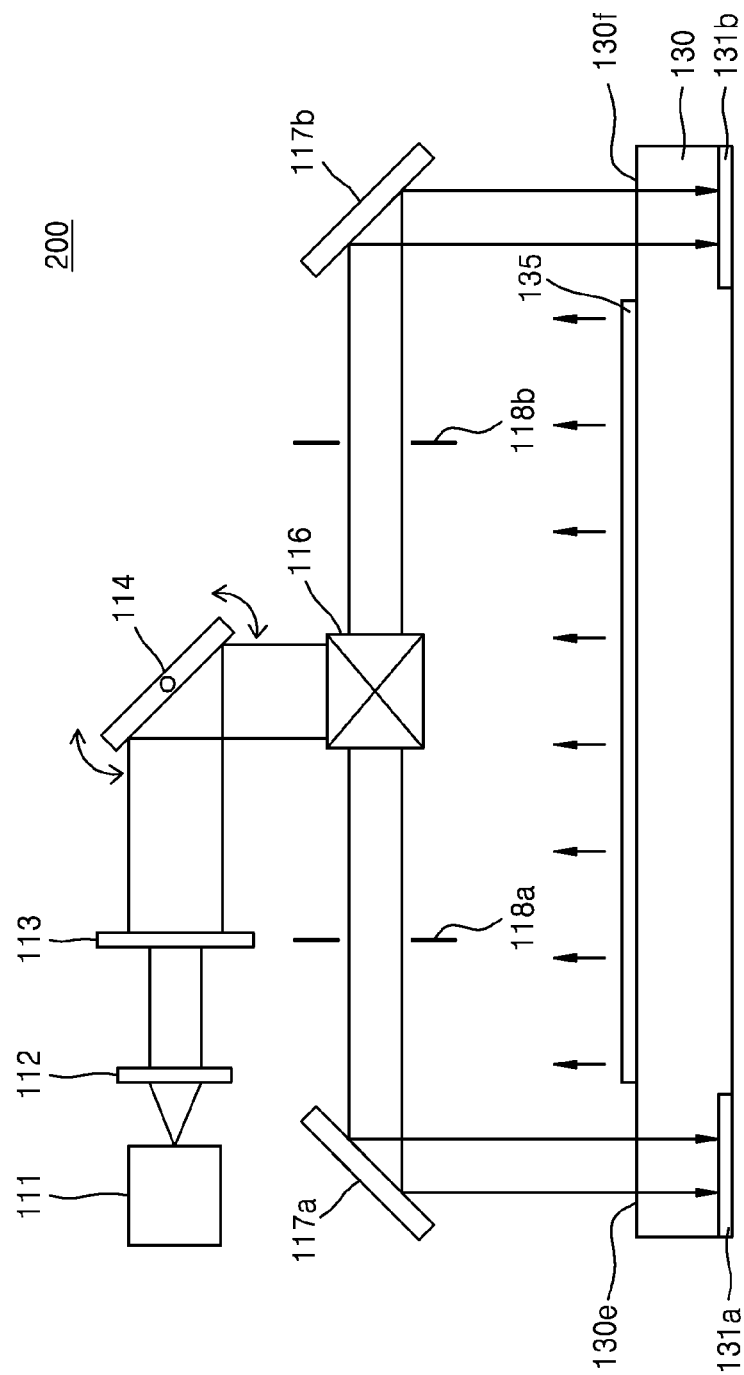
FIG. 11 is a cross-sectional view illustrating the schematic structure of the BLU of FIG. 10.

FIG. 11 is a cross-sectional view illustrating a schematic structure of the BLU 200 of FIG. 10, according to an exemplary embodiment. Referring to FIG. 11, first illumination light, split by the beam splitter 116, may be reflected from a first minor 117a and then incident onto the first light incidence surface 130e of the light guide plate 130. Thereafter, the first illumination light may travel into the light guide plate 130 via the first input coupler 131 and then may be emitted from the light guide plate 130, through the output coupler 135, to travel toward a first viewing zone. Also, second illumination light, split by the beam splitter 116, may be reflected from a second mirror 117b and then incident onto a second light incidence surface 130f of the light guide plate 130. Thereafter, the second illumination light may travel into the light guide plate 130 via the second input coupler 131b and then may be emitted from the light guide plate 130 through the output coupler 135 to travel toward a second viewing zone. The structure of the light guide plate 130 shown in FIG. 7 is exemplarily illustrated in FIG. 11, and the structure of the light guide plate 130 shown in FIG. 5 may be applied.

The beam deflector 114 may adjust a traveling direction of illumination light incident onto the beam splitter 116. Thus, the beam deflector 114 may adjust the incidence angles of the first illumination light and the second illumination light respectively incident onto the first light incidence surface 130e and the second light incidence surface 130f of the light guide plate 130. As a result, traveling directions of the first illumination light and the second illumination light emitted toward the light emission surface of the light guide plate 130 may be simultaneously adjusted by using the beam deflector 114.

The first illumination light and the second illumination light may be simultaneously provided to the spatial light modulator 150 or may be alternately provided to the spatial light modulator 150. For this, the BLU 200 may further include a first light shutter 118a that transmits or blocks the first illumination light and a second light shutter 118b that transmits or blocks the second illumination light. For example, when the first light shutter 118a transmits the first illumination light, the second light shutter 118b may block the second illumination light. When the first light shutter 118a blocks the first illumination light, the second light shutter 118b may transmit the second illumination light. According to this method, the first illumination light and the second illumination light may be alternately provided to the spatial light modulator 150. The first light shutter 118a may be positioned on any light path of the first illumination light between the beam splitter 116 and the first light incidence surface 130e. The second light shutter 118b may be positioned on any light path of the second illumination light between the beam splitter 116 and the second light incidence surface 130f.

Figure 12:
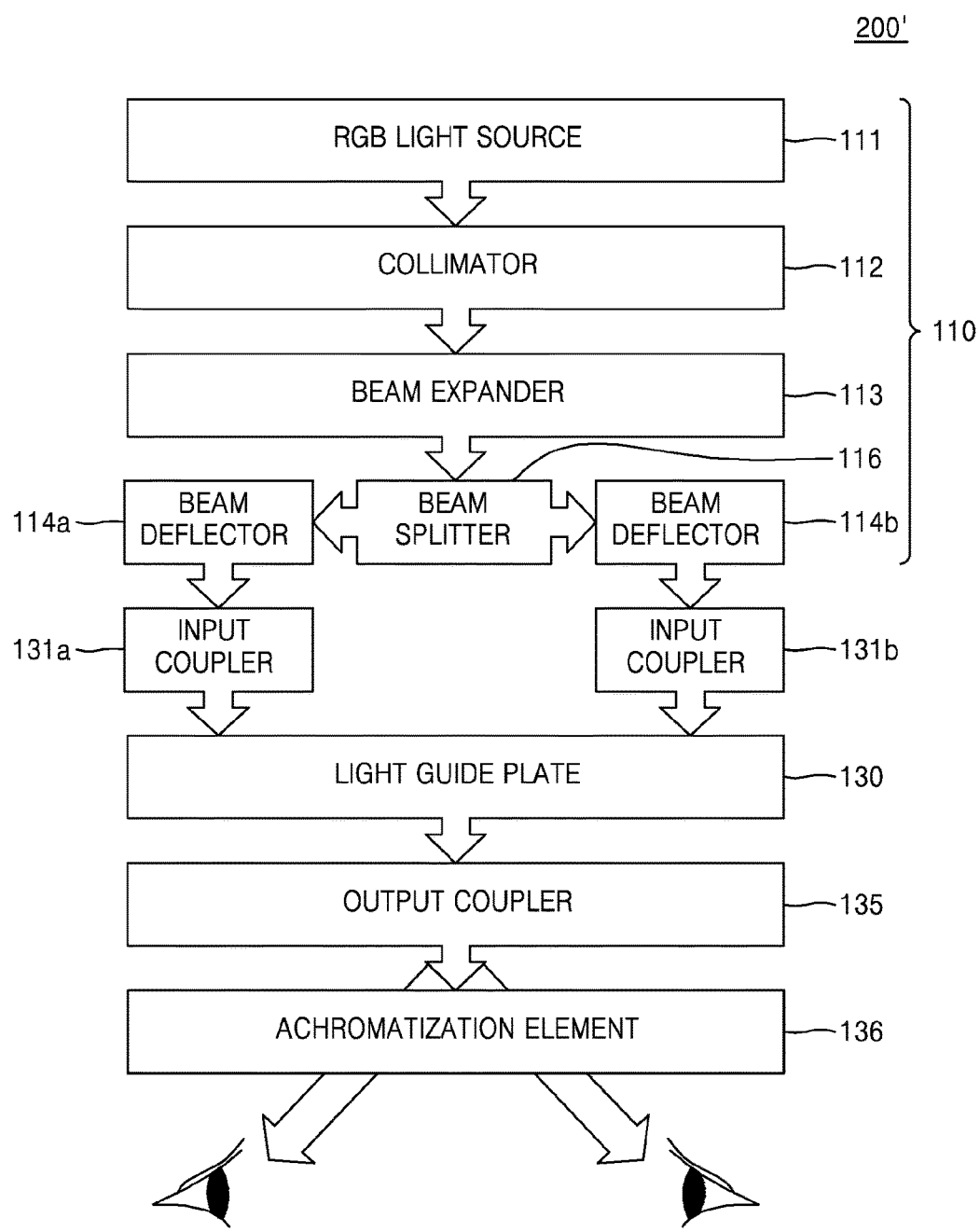
FIG. 12 is a block diagram illustrating a schematic structure of a BLU according to another exemplary embodiment.

FIG. 12 is a block diagram illustrating a schematic structure of a BLU 200' according to another exemplary embodiment. The BLU 200' of FIG. 12 is different from the BLU 200 of FIG. 10 in that traveling directions of illumination light, split by the beam splitter 116, may be separately adjusted by using two beam deflectors 114a and 114b. For example, the light source unit 110 may include the light source 111, the collimator 112, the beam expander 113, the beam splitter 116, and the first and second beam deflectors 114a and 114b. The light source 111 generates illumination light, and the collimator 112 collimates the illumination light. The beam expander 113 increases a beam diameter of the illumination light, and the beam splitter 116 splits the illumination light into two illumination light beams. The first and second beam deflectors 114a and 114b respectively adjust the traveling directions of the two illumination light beams. The other elements of the BLU 200' of FIG. 12 may be equal to the elements of the BLU 200 of FIG. 100.

Figure 13:
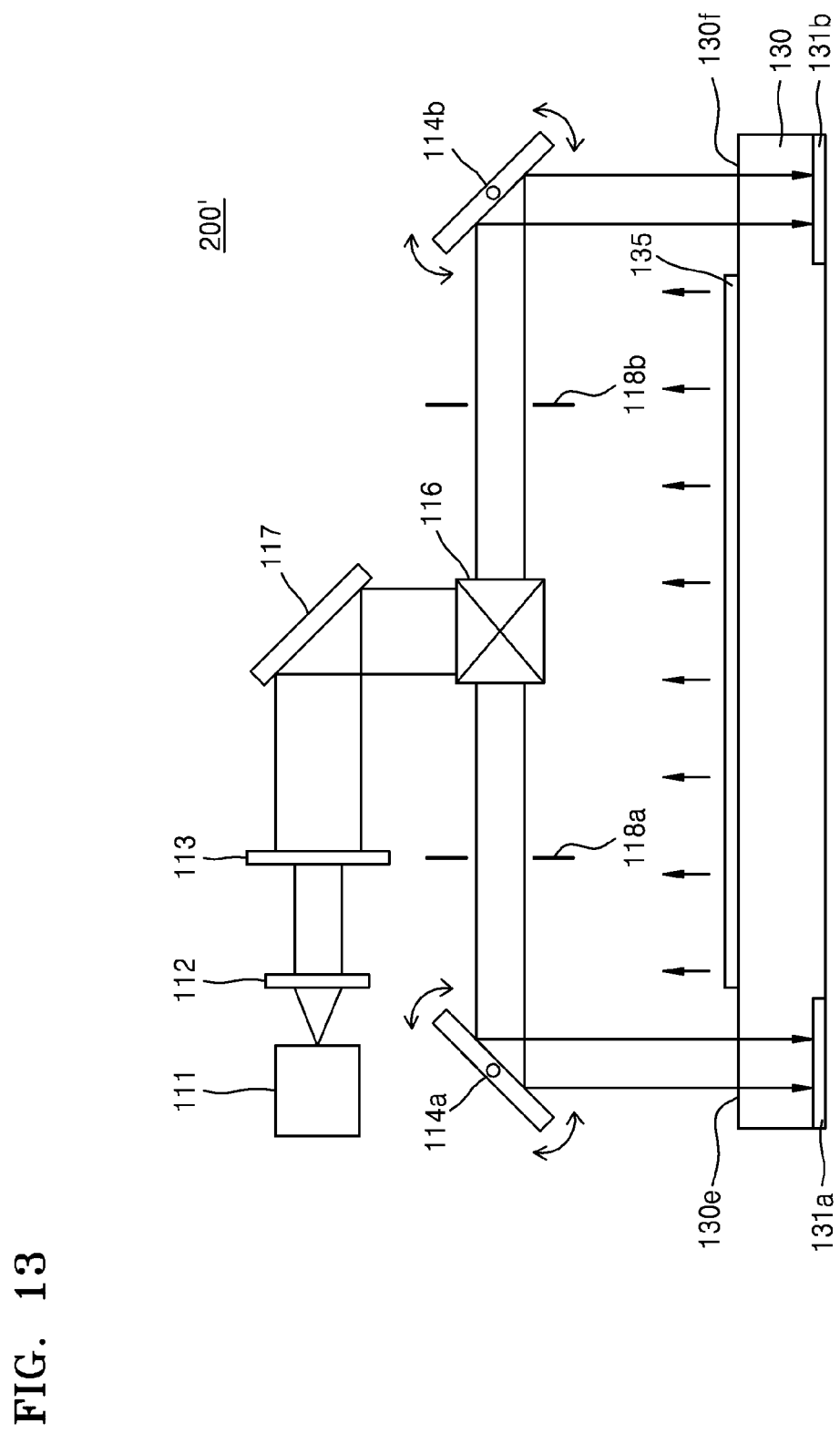
FIG. 13 is a cross-sectional view illustrating the schematic structure of the BLU of FIG. 12.

FIG. 13 is a cross-sectional view illustrating a schematic structure of the BLU 200' of FIG. 12, according to an exemplary embodiment. Referring to FIG. 13, the beam splitter 116 may split illumination light, emitted from the beam expander 113, into first illumination light and second illumination light. In FIG. 13, a mirror 117 is disposed between the beam expander 113 and the beam splitter 116, to bend a light path. However, the mirror 117 may be removed to form the light path in a straight line from the light source 111 to the beam splitter 116. Also, the first illumination light and the second illumination light, split by the beam splitter 116, may be respectively incident onto the first beam deflector 114a and the second beam deflector 114b. The first beam deflector 114a may adjust an incidence angle of the first illumination light incident onto the first light incidence surface 130e of the light guide plate 130. Also, the second beam deflector 114b may adjust an incidence angle of the second illumination light incident onto the second light incidence surface 130f of the light guide plate 130. Therefore, traveling directions of the first illumination light and the second illumination light emitted toward the light emission surface of the light guide plate 130 may be separately adjusted by using the first and second beam deflectors 114a and 114b.

Figure 14:
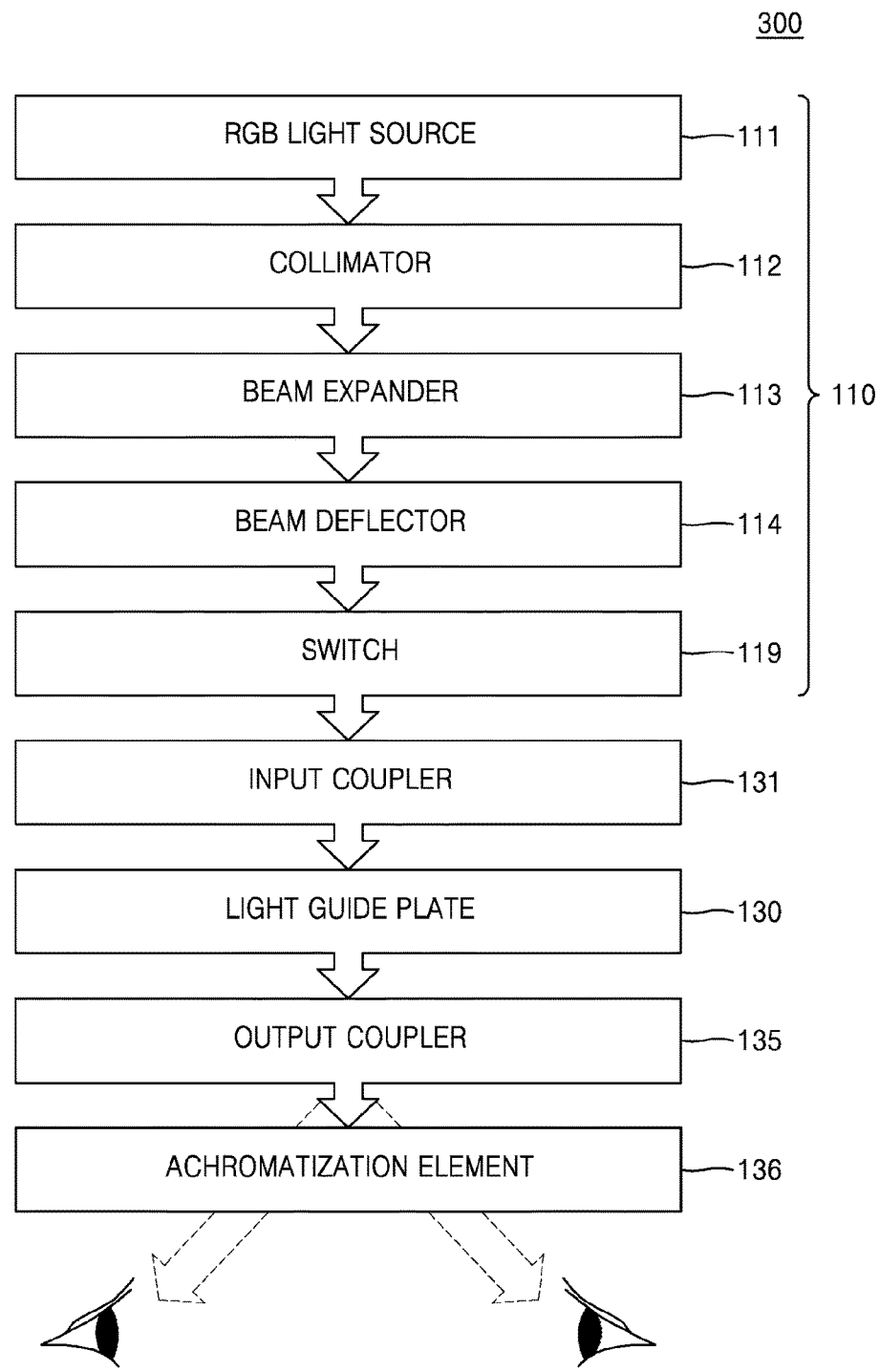
FIG. 14 is a block diagram illustrating a schematic structure of a BLU according to another exemplary embodiment.

FIG. 14 is a block diagram illustrating a schematic structure of a BLU 300 according to another exemplary embodiment. Referring to FIG. 14, the BLU 300 may include the light source unit 110, the light guide plate 130, the input coupler 131, the output coupler 135, and the achromatization element 136. The light source unit 110 provides illumination light, and the light guide plate 130 is transparent and includes a light incidence surface onto which the illumination light provided from the light source unit 110 is incident and a light emission surface which emits the incident illumination light. The input coupler 131 is disposed on the light incidence surface of the light guide plate 130 to couple the illumination light incident onto the light incidence surface into the light guide plate 130. The output coupler 135 is disposed on the light emission surface of the light guide plate 130 to emit the illumination light outside the light guide plate 130. The achromatization element 136 combines the illumination light, separated into different colors by the output coupler 135, into white light.

the light source unit 110 may include the light source 111, the collimator 112, the beam expander 113, the beam deflector 114, and a switch 119. The light source 111 generates illumination light, and the collimator 112 collimates the illumination light. The beam expander 113 increases a beam diameter of the illumination light, and the beam deflector 114 adjusts an incidence angle of the illumination light incident onto the light guide plate 130. The switch 119 adjusts a traveling direction of the illumination light to selectively direct the illumination light emitted from the light guide plate 130 to a first or second viewing zone. For example, the switch 119 may alternately adjust a direction of the illumination light incident onto the light guide plate 130 into one of two different directions so as to provide the illumination light into the first viewing zone when a right eye hologram image is formed and provide the illumination light into the second viewing zone when a left eye hologram image is formed. Also, the beam deflector 114 may minutely adjust an incidence angle of the illumination light according to changes in positions of pupils of an observer within a direction of the first or second viewing zone selected by the switch 119. Therefore, the BLU 300 may provide the illumination light to two different viewing zones by using the one light source unit 110 without a beam splitter 116.

Figure 15:
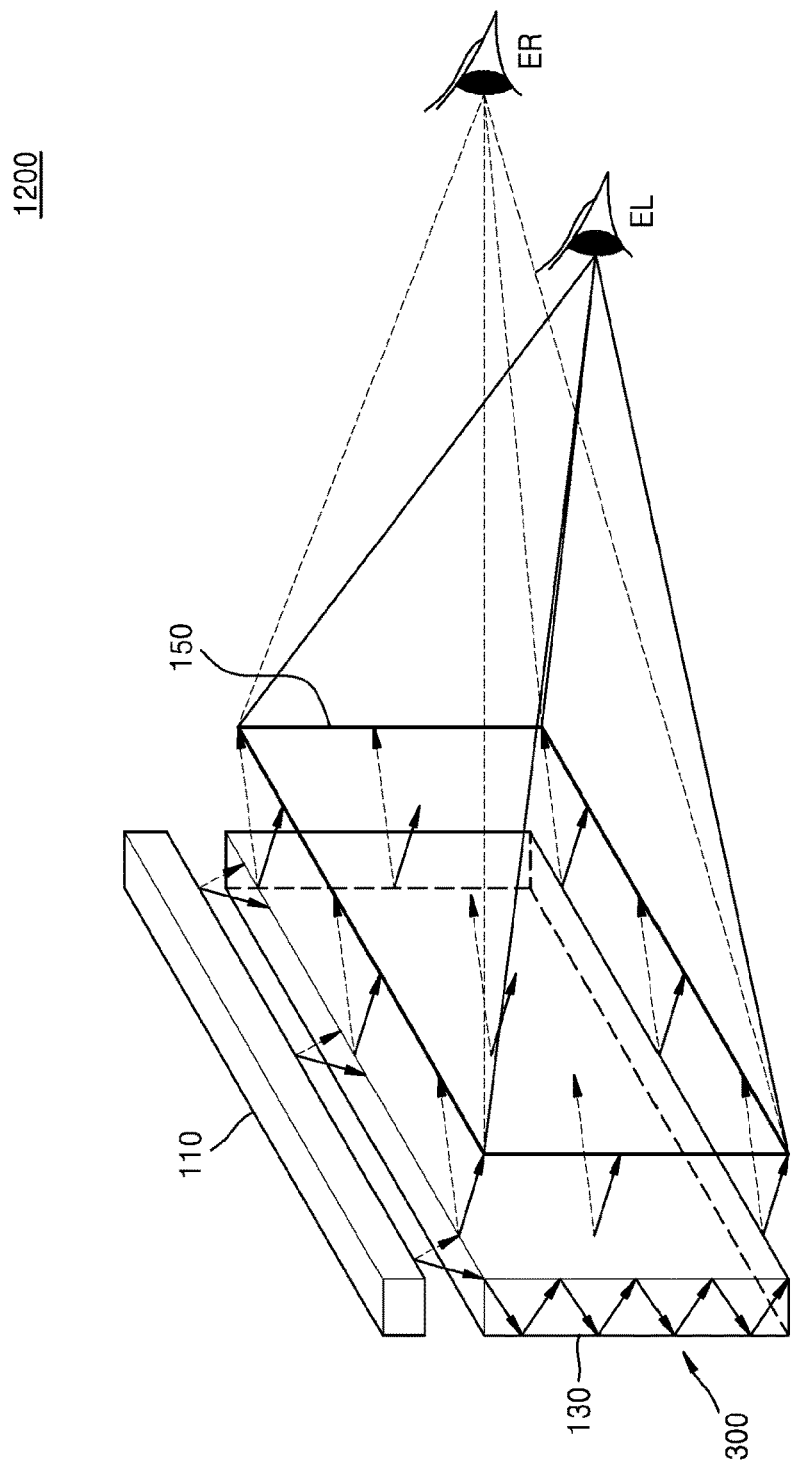
FIG. 15 is a perspective view illustrating a schematic structure of a holographic display apparatus including the BLU of FIG. 14, according to an exemplary embodiment.

FIG. 15 is a perspective view illustrating a schematic structure of a holographic display apparatus 1200 including the BLU 300 of FIG. 14, according to an exemplary embodiment. Referring to FIG. 15, the holographic display apparatus 1200 may include the BLU 300 and the spatial light modulator 150. The BLU 300 provides illumination light to the spatial light modulator 150, and the spatial light modulator 150 forms a hologram pattern having an interference pattern for modulating the illumination light. The illumination light may be diffracted and modulated by the hologram pattern formed by the spatial light modulator 150 to form a hologram image in a position in predetermined space. Although omitted in FIG. 15, the holographic display apparatus 1200 may further include the eye tracking unit 160 and the controller 170 shown in FIG. 2.

As shown in FIG. 15, the light source unit 110 may be disposed opposite an edge of the light guide plate 130. Also, the light incidence surface of the light guide plate 130 and the input coupler 131 may be disposed at an edge of the light guide plate 130 to which the light source unit 110 is opposite. For example, the light incidence surface and the input coupler 131 may be disposed along an upper edge of the light guide plate 130, and the light source unit 110 may be disposed to be opposite to the upper edge of the light guide plate 130. When a first viewing zone (e.g., a right eye viewing zone of the observer) and a second viewing zone (e.g., a left eye viewing zone of the observer) are in different positions in a horizontal direction, an upper side may refer to an edge that is positioned above the light guide plate 130 in a vertical direction of the light guide plate 130. However, positions of the light source 110 are not limited thereto and may be different according to a characteristic of the output coupler 135. For example, the light source unit 110 may be disposed at a lower edge, left edge, or a right edge of the light guide plate 130.

For example, when the holographic display apparatus 1200 forms a right eye hologram image, the switch 119 may direct the illumination light toward the right, as shown with dotted line arrows in FIG. 15. In this case, the illumination light may travel from an inside of the light guide plate 130 toward the right direction to be emitted into a viewing zone of a right eye ER of the observer. When the holographic display apparatus 1200 forms a left eye hologram image, the switch 119 may direct the illumination light toward the left as shown with full line arrows. In this case, the illumination light may travel from the inside of the light guide plate 130 toward the left direction to be emitted into a viewing zone of a left eye EL of the observer by the output coupler 135. According to this method, the switch 119 may alternately provide the illumination light deflected by the beam deflector 114 into different viewing zones. The beam deflector 114 may minutely adjust an incidence angle of the illumination light according to changes in pupils of the observer within the first or second viewing zone selected by the switch 119.

However, if an operation angle range of the beam deflector 114 is very large, the switch 119 may be omitted, and a traveling direction of the illumination light may be adjusted by using only the beam deflector 114. For example, when the holographic display apparatus 1200 forms a right eye hologram image, the beam deflector 114 may direct the illumination light toward the right as shown with the dotted line arrows. Simultaneously, the beam deflector 114 may adjust an incidence angle of the illumination light according to changes in the pupils of the observer in the viewing zone of the right eye ER. Also, when the holographic display apparatus 1200 forms the left eye hologram image, the beam deflector 114 may direct the illumination light toward the left as shown with the full line arrows. Simultaneously, the beam deflector 114 may adjust the incidence angle of the illumination light according to the changes in the pupils of the observer in the viewing zone of the left eye EL. According to this method, the beam deflector 114 may alternately provide the illumination light into different viewing zones and simultaneously minutely adjust the incidence angle of the illumination light according to the changes in the pupils of the observer.

Figure 16:
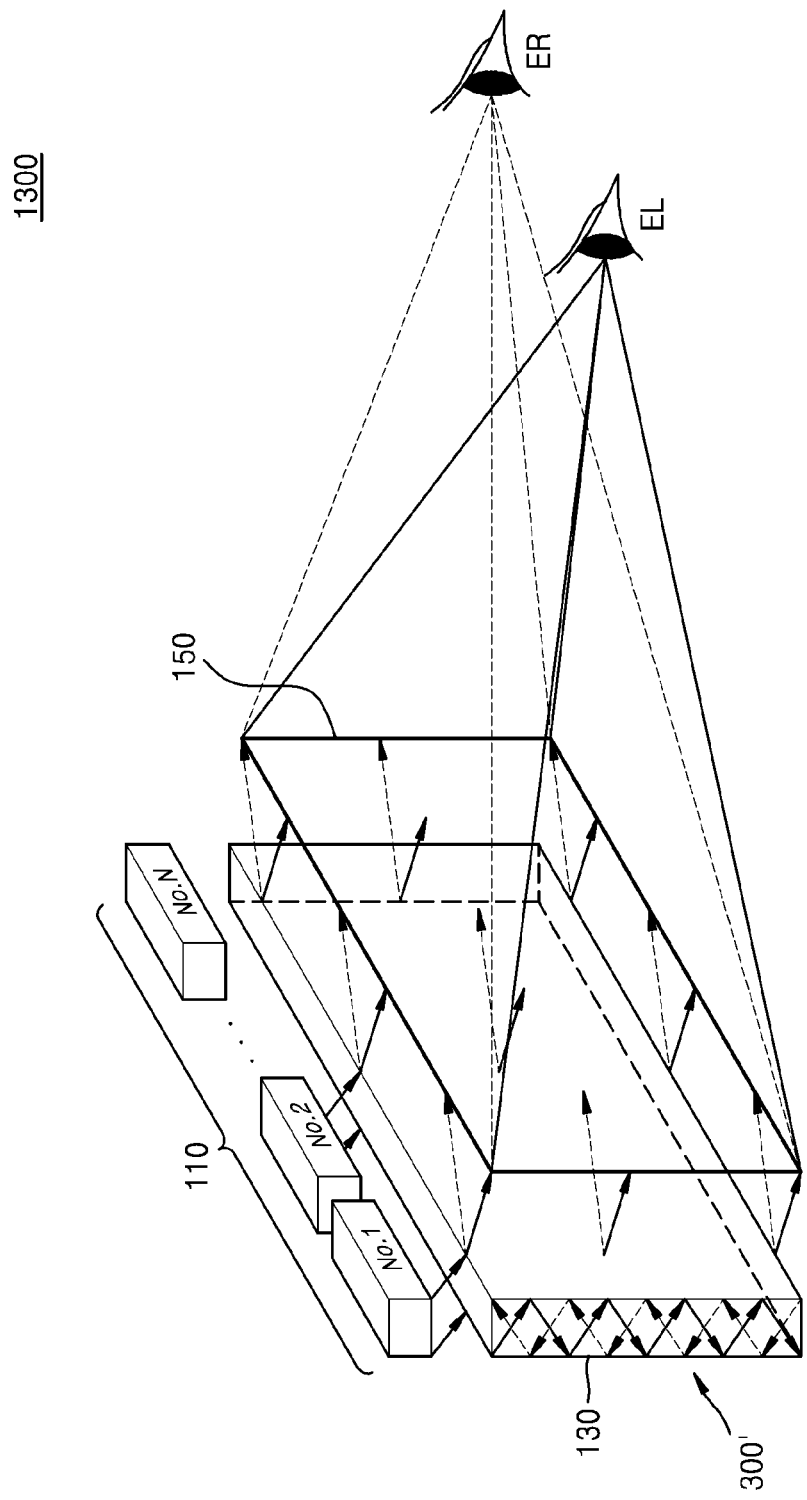
FIG. 16 is a perspective view illustrating a schematic structure of a holographic display apparatus according to another exemplary embodiment.

FIG. 16 is a perspective view illustrating a schematic structure of a holographic display apparatus 1300 according to another exemplary embodiment. Referring to FIG. 16, a BLU 300' of the holographic display apparatus 1300 is different from the BLU 300 of the holographic display apparatus 1200 of FIG. 15 in that the light source unit 110 includes arrays of a plurality of light source cells. For example, the light source unit 110 may include a plurality of light source cells that are arrayed along an upper edge of the light guide plate 130. The light source 111, the collimator 112, the beam expander 113, the beam deflector 114, and the switch 119 may be disposed in each of the plurality of light source cells of the light source unit 110. The other elements of the holographic display apparatus 1300 of FIG. 16 may be equal to the elements of the holographic display apparatus 1200 of FIG. 15.

While one or more exemplary embodiments have been described herein with reference to the figures, it will be understood by those of ordinary skill in the art that various changes in form and details may be made therein without departing from the spirit and scope as defined by the following claims.

What is claimed is:

1. A backlight unit (BLU) comprising:
a light source unit that emits illumination light;
a light guide plate that is transparent and comprises a light incidence surface, on which the illumination light emitted by the light source unit is incident, and a light emission surface through which the illumination light is emitted;
an input coupler that directs the illumination light from the light source unit into the light guide plate; and
an output coupler that is disposed on the light emission surface of the light guide plate, wherein the illumination light is emitted from the light guide plate through the output coupler,
wherein the light source unit comprises a beam deflector that controls an incidence angle of the illumination light incident onto the light guide plate,
wherein the beam deflector is selectively controlled to change a traveling direction of the illumination light onto the light guide plate based on changes in positions of pupils of an observer,
wherein the light guide plate has a flat panel shape such that the light guide plate totally internally reflects the illumination light emitted by the light source unit,
wherein the light guide plate has an upper surface and a lower surface, and
wherein the illumination light entering into the light guide plate is totally internally reflected between the upper surface and the lower surface.

2. The BLU of claim 1, wherein:
the light source unit further comprises:
a first light source unit that emits first illumination light that is directed to a first viewing zone and a second light source unit that emits second illumination light that is directed to a second viewing zone, different from the first viewing zone;
the light incidence surface of the light guide plate comprises a first light incidence surface on which the first illumination light is incident and a second light incidence surface on which the second illumination light is incident; and
the input coupler comprises a first input coupler, wherein the first illumination light is incident on the first light incidence surface through the first input coupler, and a second input coupler, wherein the second illumination light is incident on the second light incidence surface through the second input coupler.

3. The BLU of claim 2, wherein the first light incidence surface is disposed on a first side of the light guide plate, and the second light incidence surface is disposed on a second side of the light guide plate, opposite the first side;
wherein the first light source unit faces the first light incidence surface, and the second light source unit faces the second light incidence surface.

4. The BLU of claim 2, wherein the light guide plate is configured such that the first illumination light and the second illumination light are both emitted through the same light emission surface, and the output coupler is configured such that the first illumination light is emitted at a first angle and the second illumination light is emitted at a second angle, different from the first angle.

5. The BLU of claim 2, wherein the first light source unit comprises:
a first light source that generates the first illumination light;
a first collimator that collimates the first illumination light;
a first beam expander that increases a beam diameter of the first illumination light, output by the first collimator; and
a first beam deflector that adjusts an incidence angle of the first illumination light, output by the first beam expander, onto the first light incidence surface.

6. The BLU of claim 5, wherein the second light source unit comprises:
a second light source that generates the second illumination light;
a second collimator collimates the second illumination light;
a second beam expander that increases a beam diameter of the second illumination light, output by the second collimator; and
a second beam deflector that adjusts an incidence angle of the second illumination light, output by the second beam expander, incident onto the second light incidence surface.

7. The BLU of claim 6, wherein the first light source and the second light source emit coherent white light.

8. The BLU of claim 1, wherein the light source unit further comprises:
a light source that generates the illumination light;
a collimator that collimates the illumination light;
a beam expander that increases a beam diameter of the illumination light, output by the collimator, and outputs provides the illumination light to the beam deflector; and
a beam splitter that splits the illumination light, output by the beam deflector into first illumination light and second illumination light,
wherein the beam deflector is disposed on an optical path between the beam expander and the beam splitter.

9. The BLU of claim 8, wherein:
the light incidence surface comprises a first light incidence surface onto which the first illumination light is incident and a second light incidence surface onto which the second illumination light is incident; and
the input coupler comprises a first input coupler that directs the first illumination light into the light guide plate and a second input coupler that directs the second illumination light into the light guide plate.

10. The BLU of claim 9, wherein the first light incidence surface is disposed on a first side of the light guide plate, and the second light incidence surface is disposed on a second side of the light guide plate, opposite the first side.

11. The BLU of claim 9, wherein the light guide plate is configured such that the first illumination light and the second illumination light are both emitted through the same light emission surface, and the output coupler is configured such that the first illumination light is emitted into a first viewing zone and the second illumination light is emitted into a second viewing zone, different from the first viewing zone.

12. The BLU of claim 1, wherein the light source unit comprises:
a light source that generates the illumination light;
a collimator that collimates the illumination light;
a beam expander that increases a beam diameter of the illumination light, output by the collimator; and
a beam splitter that splits the illumination light, output from the beam expander, into first illumination light and second illumination light.

13. The BLU of claim 12, wherein:
the beam deflector comprises a first beam deflector that adjusts an incidence angle of the first illumination light and a second beam deflector that adjusts an incidence angle of the second illumination light;

the light incidence surface comprises a first light incidence surface onto which the first illumination light is incident and a second light incidence surface onto which the second illumination light is incident; and the input coupler comprises a first input coupler that directs the first illumination light into the light guide plate and a second input coupler that directs the second illumination light into the light guide plate.

14. The BLU of claim 13, wherein the first light incidence surface is disposed on a first side of the light guide plate and the second light incidence surface is surfaces disposed on a second side of the light guide plate, opposite the first side.

15. The BLU of claim 13, wherein the light guide plate is configured such that the first illumination light and the second illumination light are both emitted through the same light emission surface, and the output coupler is configured such that the first illumination light is emitted into a first viewing zone and the second illumination light is emitted into a second viewing zone different from the first viewing zone.

16. The BLU of claim 1, wherein the light source unit further comprises:
a light source that generates the illumination light;
a collimator that collimates the illumination light; and
a beam expander that increases a beam diameter of the illumination light, output by the collimator, and directs the illumination light to the beam deflector.

17. The BLU of claim 16, wherein the beam deflector is configured to provide the illumination light alternately to a first viewing zone and to a second viewing zone, different from the first viewing zone.

18. The BLU of claim 17, wherein the light incidence surface is an edge of the light guide plate, the input coupler is disposed on the edge of the light guide plate, and the light source unit is disposed facing the light incidence surface.

19. The BLU of claim 18, wherein the first viewing zone is spaced from the second viewing zone in a horizontal direction, and the edge of the light guide plate is one of an upper edge of the light guide plate and a lower edge of the light guide plate.

20. The BLU of claim 16, wherein the light source unit further comprises:
a switch that directs the illumination light, deflected by the beam deflector, alternately to a first viewing zone and a second viewing zone, different from the first viewing zone.

21. The BLU of claim 1, further comprising:
an achromatization element that combines the illumination light, output from the output coupler, into white light.

22. The BLU of claim 1, wherein each of the input coupler and the output coupler comprises one of a holographic grating having a diffraction pattern and a photopolymers having a periodic refractive index distribution.

23. The BLU of claim 1, wherein the input coupler is disposed on a first surface of the light guide plate and the output coupler is disposed on a second surface of the light guide plate, opposite the first surface,
wherein the input coupler is disposed on an edge area of the first surface, and the output coupler is disposed on a central area of the second surface.

24. The BLU of claim 1, wherein the input coupler is directly disposed on the light incidence surface of the light guide plate or on a surface of the light guide plate that is opposite to the light incidence surface of the light guide plate.

25. A holographic display apparatus comprising:
a backlight unit (BLU); and
a spatial light modulator that modulates illumination light, output from the BLU, thereby forming a hologram image,
wherein the BLU comprises:
a light source unit that emits the illumination light;
a light guide plate that is transparent and comprises a light incidence surface, on which the illumination light emitted by the light source unit is incident, and a light emission surface through the illumination light is emitted;
an input coupler that directs the illumination light from the light source unit into the light guide plate; and
an output coupler that is disposed on the light emission surface of the light guide plate, wherein the illumination light is emitted from the light guide plate through the output coupler,
wherein the light source unit comprises a beam deflector that controls an incidence angle of the illumination light incident onto the light guide plate,
wherein the beam deflector is selectively controlled to change a traveling direction of the illumination light onto the light guide plate based on changes in positions of pupils of an observer,
wherein the light guide plate has a flat panel shape such that the light guide plate totally internally reflects the illumination light emitted by the light source unit,
wherein the light guide plate has an upper surface and a lower surface, and
wherein the illumination light entering into the light guide plate is totally internally reflected between the upper surface and the lower surface.

26. The holographic display apparatus of claim 25, further comprising:
an eye tracking unit that tracks the positions of pupils of the observer,
wherein the beam deflector controls the incidence angle of the illumination light incident onto the light guide plate according to the positions of the pupils of the observer.

* * * * *